United States Patent
Denoual et al.

(10) Patent No.: US 9,258,530 B2
(45) Date of Patent: Feb. 9, 2016

(54) METHOD FOR ACCESSING A SPATIO-TEMPORAL PART OF A COMPRESSED VIDEO SEQUENCE USING DECOMPOSED ACCESS REQUEST

(75) Inventors: Franck Denoual, Saint Domineuc (FR); Youenn Fablet, La Dominelais (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 577 days.

(21) Appl. No.: 13/639,838

(22) PCT Filed: Apr. 8, 2011

(86) PCT No.: PCT/IB2011/051528
§ 371 (c)(1),
(2), (4) Date: Oct. 5, 2012

(87) PCT Pub. No.: WO2011/125051
PCT Pub. Date: Oct. 13, 2011

(65) Prior Publication Data
US 2013/0039419 A1    Feb. 14, 2013

(30) Foreign Application Priority Data
Apr. 9, 2010  (FR) .................................... 10 52718

(51) Int. Cl.
*H04N 7/32*      (2006.01)
*H04N 7/173*     (2011.01)
*H04N 21/2343*   (2011.01)
*H04N 21/2668*   (2011.01)
*H04N 21/4728*   (2011.01)
*H04N 21/6587*   (2011.01)

(52) U.S. Cl.
CPC ... *H04N 7/17336* (2013.01); *H04N 21/234363* (2013.01); *H04N 21/2668* (2013.01); *H04N 21/4728* (2013.01); *H04N 21/6587* (2013.01)

(58) Field of Classification Search
CPC ............... H04N 7/17336; H04N 21/234363; H04N 21/2668; H04N 21/4728; H04N 21/6587
See application file for complete search history.

(56) References Cited

U.S. PATENT DOCUMENTS

| | | | | |
|---|---|---|---|---|
| 5,285,528 A * | 2/1994 | Hart | | 710/200 |
| 5,608,870 A * | 3/1997 | Valiant | | 711/100 |
| 5,610,841 A * | 3/1997 | Tanaka et al. | | 725/115 |
| 6,721,490 B1 * | 4/2004 | Yao et al. | | 386/351 |
| 6,738,758 B1 * | 5/2004 | Li et al. | | 709/223 |

(Continued)

FOREIGN PATENT DOCUMENTS

EP    1710719 A1    10/2006

*Primary Examiner* — Jay Patel
*Assistant Examiner* — Joseph Suh
(74) *Attorney, Agent, or Firm* — Canon USA, Inc. IP Division

(57) ABSTRACT

A processing method and an associated device for accessing a spatio-temporal part of a compressed video sequence.
The method includes the following steps:
  obtaining a request for access to the part by identifying a temporal section defined between initial and final times of the initial and final spatial regions—different from the initial region of the sequence at the initial and final times;
  decomposing the access request into a plurality of elementary requests for access to a video fragment, each elementary request identifying a fixed spatial region to extract in a temporal sub-interval of the temporal section; and
exploiting at least one elementary request to access video fragments constituting the part to access.

21 Claims, 10 Drawing Sheets

(56) References Cited

U.S. PATENT DOCUMENTS

| | | | |
|---|---|---|---|
| 6,920,450 B2* | 7/2005 | Aono et al. | 707/739 |
| 2002/0021353 A1* | 2/2002 | DeNies | 348/36 |
| 2002/0073229 A1* | 6/2002 | Hayashi | 709/237 |
| 2003/0187575 A1* | 10/2003 | King et al. | 701/213 |
| 2004/0175058 A1* | 9/2004 | Jojic et al. | 382/305 |
| 2004/0218626 A1* | 11/2004 | Tyldesley et al. | 370/464 |
| 2004/0243328 A1* | 12/2004 | Rapp et al. | 702/71 |
| 2005/0021539 A1* | 1/2005 | Short et al. | 707/100 |
| 2005/0154750 A1* | 7/2005 | Zhou et al. | 707/102 |
| 2006/0062478 A1 | 3/2006 | Cetin | |
| 2006/0168350 A1* | 7/2006 | Ishiyama et al. | 709/247 |
| 2006/0225089 A1* | 10/2006 | Ikeda | 725/25 |
| 2006/0262184 A1* | 11/2006 | Peleg et al. | 348/36 |
| 2006/0268871 A1* | 11/2006 | Van Zijst | 370/390 |
| 2007/0218439 A1* | 9/2007 | Delahunt et al. | 434/236 |
| 2008/0109532 A1* | 5/2008 | Denoual et al. | 709/219 |
| 2008/0145025 A1* | 6/2008 | Wimberly et al. | 386/95 |
| 2008/0209066 A1* | 8/2008 | Spio et al. | 709/231 |
| 2009/0198794 A1* | 8/2009 | Beals | 709/219 |
| 2009/0210433 A1* | 8/2009 | Werner et al. | 707/100 |
| 2009/0252217 A1* | 10/2009 | Wittig | 375/240.01 |
| 2009/0300701 A1* | 12/2009 | Karaoguz et al. | 725/119 |
| 2010/0061702 A1* | 3/2010 | Tanaka et al. | 386/95 |

* cited by examiner

*Example 1:*
*URI#xywht =10, 20, 100, 80 & T=Tx, Ty & t=$t_i$, $t_f$*
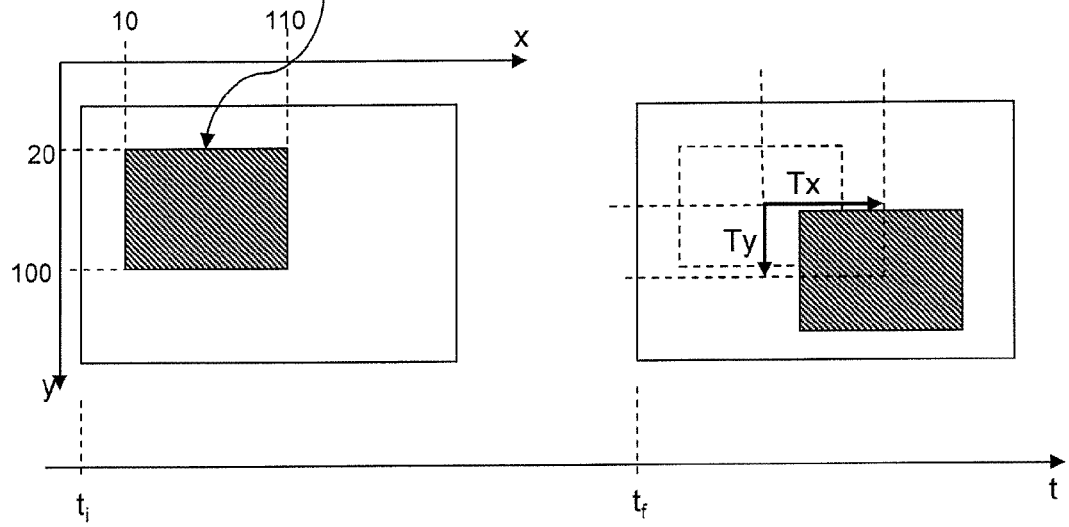
*Example 2:*
*URI#xywht=10,20,100,80 & translate=(Tx, Ty) & scale=(sx, sy) & t=$t_i$, $t_f$*
*Example 3:*
*URI#xywht=10,20,100,80 & A=sx, 0, 0, sy, Tx, Ty & t=$t_i$, $t_f$ & granularity=high*
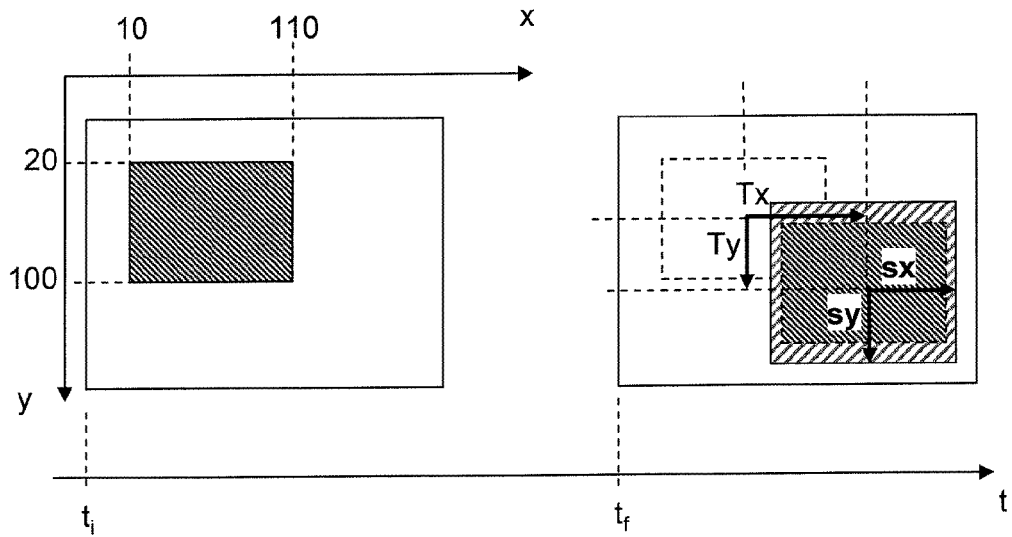
Figure 14

METHOD FOR ACCESSING A SPATIO-TEMPORAL PART OF A COMPRESSED VIDEO SEQUENCE USING DECOMPOSED ACCESS REQUEST

The present invention concerns a method of accessing a spatio-temporal part of a video sequence, as well as an associated device. It applies in particular to the compressed sequences which constitute the conventional and economical format for storing video data, in particular on Internet servers.

Video compression algorithms, such as those standardized by the standardization organizations ITU, ISO, and SMPTE, exploit the spatial and temporal redundancies of the images in order to generate bitstreams of data of smaller size than the original video sequences. Such compressions make the transmission and/or the storage of the video sequences more efficient.

Most of the video compression schemes, such as the MPEG-1, MPEG-2, MPEG-4, H.261, H.263, H.264 or H.265 formats, take advantage of the so-called "temporal" redundancies between several successive images of the same sequence. Thus, most of the images are coded relative to one or more reference images by copying similar blocks and coding the prediction error. This prediction is commonly referred to as temporal or "Inter".

In the case of the MPEG-2 format for example, images of I type (I for Intra) are encoded without reference to other images of the sequence. Thus, when all the compressed data of such an image are available, a decoder may decode and display that image immediately. An image of I type thus constitutes a conventional point of access to the video sequence. It is to be noted that, conventionally, these images of I type are presented periodically, with a period of the order of several tenths of a second to a few seconds. In the case of the H.264 format, these images are denoted "IDR" or "SI".

The MPEG-2 format also implements images of P type (prediction on the basis of the last I image) or B (bi-directional prediction on the basis of preceding and following images of P or I type) which are encoded by prediction relative to one or more reference images. The data compressed relative to such images (i.e. data coding the prediction errors) are not sufficient to obtain an image that can be displayed. This is because the data of the reference images which were used at the time of the prediction must be obtained. Images of P type and B type do not therefore constitute efficient points of access to the video sequence.

The temporal prediction mechanism consequently proves to be extremely efficient in terms of compression, but imposes constraints on the video decoders that wish to provide proper reconstruction of the images of the same sequence, in particular by limiting the temporal random access for the compressed video sequence only to the images of I type.

Cumulatively with the exploitation of temporal redundancies, the video coders also take advantage of so-called "spatial" redundancies within the same image. For this, each image is decomposed into spatial units, blocks or macroblocks, and a block may be predicted from one or more of its spatially neighboring blocks, which is commonly referred to as spatial prediction or "Intra" prediction.

This mechanism when applied in particular in the case of the Intra images referred to previously also notably improves the compression of a video sequence. However, dependency between the blocks is introduced, and this complicates spatial extraction of part only of the sequence.

To mitigate this drawback, certain coding schemes such as H.264 provide an organization of the blocks into interdependent packets or "slices" of blocks not having spatial dependencies with blocks outside that packet. The organization into packets relies on a technique known as FMO for "Flexible Macroblock Ordering".

These packets are very often signaled by markers enabling a decoder to obtain access thereto without performing decoding and complete reconstruction of the image, and in particular of the blocks which precede them in the image. Each packet or slice thus constitutes a point of "access" to the video sequence or of spatial synchronization on the basis of which the decoder has no difficulty in performing decoding independently of the other packets.

Nevertheless, for these blocks, temporal dependencies may remain if the image is coded with reference to one or more other images. Thus, the accumulation of the temporal and spatial predictions means that generally the extraction of a spatio-temporal part of a video sequence, that is to say a spatial portion during a temporal section of several consecutive images of the sequence, is a complex operation.

The extraction of a spatio-temporal part from a video sequence is desirable in numerous applications and these days is the subject of extensive developments.

The W3C ("World Wide Web Consortium", an organization producing standards for the Web) is working on the development of a mechanism for addressing temporal segments or spatial regions in resources that are available on the Web such as video sequences, by using in particular URIs ("Uniform Resource Identifiers") making it possible to identify, via a string, a physical or abstract resource.

This mechanism, independently of the format of representation of the resource, is termed "Media Fragments".

The RFC ("Request For Comments") memorandum number 3986 defines a syntax for the URIs, and integrates in particular the concepts of "fragment" and of "queries" or requests. In this context, a fragment is in particular a part, a subset, a view or a representation of a primary resource.

The "Media Fragments" addressing enabling the access to sub-parts of the audio or video stream or within images, by addition of parameters to the request, following the URI address makes it possible for example to address:
  temporal segments (or "temporal fragments") defined by initial and terminal times: t=00:01:20,00:02:00 identifying the segment from 1 min 20 s to 2 min 00 s; and/or
  spatial regions (or "spatial fragments") defined by a generally rectangular viewing region: xywh=10, 10, 256, 256 specifying the upper left corner (10, 10), the width (256) and the height (256) of the rectangle; and/or
  substreams (or "track fragments"), for example a particular audio track associated with a video track='audio_fr'; and/or
  passages (or "named fragments") pre-defined via an identifier, a scene of a film for example: id='the_scene_of_the_kiss'.

In addition to the syntax of the fragments/requests for the addressing thereof, the same working group is in course of producing a client-server communication protocol based on the HTTP protocol ("Hyper Text Transfer Protocol") used on the Web.

In particular, the protocol defines the HTTP requests sent by a client wishing to obtain fragments as well as the responses sent by the server responsible for the extraction and for the sending of those fragments. Each HTTP request or associated HTTP response is composed of header information and data information. The header information may be considered as description/signaling information (in particular as to the type of the data exchanged and as to the identity of the data sent back—region finally sent back) whereas the data information correspond to the spatial and/or temporal fragment of the resource requested by the client.

When the requested fragment can be converted into "byte ranges" either because the client has already received a description of the resource before sending his request, or because the server performs an analysis of the resource before sending it, the exchange of fragments is similar to a conventional exchange of data via HTTP, which makes it possible to exploit cache mechanisms and thereby be fully integrated into a Web architecture.

If on the other hand the fragment cannot be converted into one or more byte ranges belonging to the original resource, transcoding is then necessary at the server, and the new resource so created is sent to the client like any other resource.

This addressing mechanism and the associated communication protocol are advantageously flexible in that they are independent from the video format used, from the encoding options of the video sequences and from the capacities available on the servers processing such requests.

Furthermore, the setting up of this addressing mechanism and of the associated communication protocol will eventually make it possible to significantly reduce the quantity of information exchanged between a client requesting parts of a video and a server storing that video and supplying those requested parts.

This is because, if a client only wishes to view a temporal interval of a video sequence, he henceforth no longer needs to download the entirety of the video stream, but only the desired temporal interval.

For this, he may indicate that time interval (example of t=1 min 20 s to t=2 min) in the request to transmit, in the corresponding URI:

http://www.example.org/my_video.mp4#t=00:01:20,00:02:00.

Thus, the server will only search for this portion (or "fragment") of video stream identified in the request and only this is exchanged between the server and the client. Furthermore, the transmission time as well as the bandwidth used on the communication network from the server to the client are reduced.

Of course, other filtering criteria may be added in this request.

In other applications, this addressing mechanism also makes it possible to define points of entry into a video stream for which comments, annotations or links to other resources are available, thereby facilitating hyper navigation in the video.

As shown above, the "Media Fragments" addressing mechanism enables elementary fragments of temporal or spatial type to be requested but does not make it possible to formulate more sophisticated requests such as the tracking of a spatio-temporal region. In what follows, the "Media Fragments" requests may be referred to using the terms "elementary requests", as opposed to the more advanced requests or "complex requests".

For example if a user is considered who views a video summary or a low resolution of a video with objects or characters that are of interest to him (a $ROI(t_i)$ region at a time $t_i$ and a $ROI(t_f)$ region at a time $t_f$, FIG. 1, even though a greater number of regions may be considered in other instances), this user may wish to retrieve a part of the video which corresponds to a region around the object of interest over a given time interval.

This amounts to formulating complex requests mixing at the same time temporal fragments and variable spatial fragments.

However, as described, the "Media Fragments" syntax does not enable such a request to be expressed. The only possibility is to formulate an elementary request over the time interval considered (in our example, between $t_i$ and $t_f$) with a spatial fragment corresponding to the rectangle encompassing the set of the regions of interest (maxROI rectangle in FIG. 1).

In this case, the maxROI set of the data is extracted by the server over the temporal section $[t_i, t_f]$, then sent to the client. A major drawback lies in the fact that this approach may lead to the transmission of a very large number of data, and thus unnecessarily occupy the bandwidth of the communication network between the server and the client.

Furthermore, the client must manipulate a high number of data (storage, placing in random access memory, etc.) in order, before being able to exploit the data, to perform a selection of the relevant data among the data received.

There is thus a need to enable tracking of a moving region of interest in a video sequence, that is precise and of lower-cost, in particular in terms of data sent.

Earlier trials on the JPEG-2000 technology are however known, for which a communication protocol (JPIP) for the exchange of portions of image or of video was developed. This protocol also relies on the use of URI addressing and a request-response exchange.

The publication US 2006/262345 in particular describes an example of implementation in which a region of interest in a video sequence is tracked. In particular, the server storing the sequence computes the region of interest to send in each of the successive images according to an estimation of the motion between those successive images. Once the new region has been computed, it is sent by the server to the client who thus has its viewing window updated automatically.

A major drawback lies in the fact that by indicating the region of interest only at the start, the user cannot himself define the spatio-temporal fragments of his choice.

Another publication, U.S. Pat. No. 7,423,649, describes a method of generating an animation on the basis of a region of interest and a trajectory.

This method relies on dedicated JPIP requests in the JPEG-2000 format that are generated for each image of the Motion-JPEG2000 sequence. The method consists of eliminating from that list of requests those for which data have already been received and of re-ordering the remaining requests so as to have a constant-throughput animation.

A major drawback of this approach is that a very high number of requests is generated then sent to the server.

Furthermore, these different mechanisms are closely linked to the prior knowledge of the JPEG-2000 or Motion-JPEG2000 format, working image by image, without a temporal component. In other words, they are not applicable to the coding formats that create in particular inter-image dependencies.

The present invention thus aims to mitigate at least one of the aforesaid drawbacks.

To that end, the invention concerns in particular a processing method for accessing a spatio-temporal part of a compressed video sequence, comprising a step of obtaining a request for access to said spatio-temporal part through identifying a temporal section defined between an initial time and a final time in said sequence, characterized in that:
   said access request identifies an initial spatial region of the sequence at the initial time, and a final spatial region of the sequence at the final time that is different from said initial spatial region;
   and the method comprises the steps of:

decomposing said access request into a plurality of elementary requests for access to a video fragment of the sequence, each elementary request identifying a fixed spatial region to extract in a temporal sub-interval of said temporal section; and exploiting at least one elementary request to access at least one video fragment constituting said spatio-temporal part to access.

According to the invention, the dividing up of the desired temporal section into several temporal sub-intervals enables finer fixed spatial regions to be defined. This is because, during a temporal sub-interval, the regions of interest tend to undergo less modification than during the whole of the temporal section. This results in a reduction in the quantity of data transmitted.

Furthermore, as will be seen below, this decomposition makes it possible to modify, without complexity, the temporal sub-intervals and thus the associated fixed spatial regions, to adjust the quantity of data transmitted to according to certain constraints.

Lastly, the obtainment of elementary requests as defined here enables compatibility to be maintained with the "Media Fragments URI" recommendation in course of development.

This results in efficient access to the regions of interest which vary over time, that is compatible with the aforementioned recommendation, which recommendation is moreover adapted to any type of coding of the video sequence.

In an embodiment, the method comprises a step of dynamically adjusting said decomposition of the access request during the processing of elementary requests. This adjustment makes it possible in particular to modify the duration of the temporal sub-interval associated with each elementary request. This results in an adjustment of the fixed spatial regions, and thus of the data transmitted over the communication network.

It will be understood here that the present invention is concerned in particular with seeking a compromise between a high number of precise elementary requests (that is to say extracting less image data) sent out for example by the client terminal and a reduced number of less precise elementary requests (extracting more image data) still sent out by the client. It is to be noted that a high number of precise requests lightens the workloads of the client terminal and of the communication network (little image data conveyed), but in compensation increases the workload of the server (high number of requests to process). Conversely, a reduced number of less precise requests lightens the workload of the server, but ends up with more data exchanged (increase in the load for the network) and with more processing at the client side in order to extract the relevant data.

In particular, the adjusting step comprises the re-computation of the elementary requests not yet exploited into a plurality of elementary requests associated with temporal sub-intervals of modified duration. Of course, the duration of the temporal sub-intervals may be extended if the conditions for processing the data are optimum, or else be reduced if certain processing resources reach saturation. To be precise, in this last case, the fixed spatial regions will be of reduced size, and thus a reduced number of video data will be transmitted.

According to a particular feature, the re-computation of the elementary requests not yet exploited and the modification of said duration depend on a performance criterion of a client terminal establishing said access request and/or of a server device storing said video sequence and/or of a communication network linking the client terminal and the server device. The rate of the data transmitted may thus easily be adjusted to a limiting capacity in the processing process.

According to a feature of the invention, the method comprises the steps of:

transmitting said elementary request to a server device storing said video sequence and receiving, in return, at least one corresponding extracted fragment; and re-computing the elementary requests not yet exploited on the basis of said received fragment.

The quality of the responses received (by a terminal client or a proxy, for example) progressively with the exploitation of the elementary requests constitutes a good indicator of the efficiency of the settings adopted, (for example the duration of the sub-intervals), and reflects in particular the state of occupancy of the server device and/or of the communication network. Thus, an adjustment of the elementary requests on the basis thereof proves to be efficient.

In an embodiment, said decomposing depends on a performance criterion of a client terminal establishing said access request and/or of a server device storing said video sequence and/or of a communication network linking the client terminal and the server device. This provision makes it possible, from the outset, to have a relatively efficient decomposition, given the constraints of workload and resources involved in the processing.

In particular, said performance criterion is chosen from among:

the available computation capacity on the client terminal;
a priority value associated with the client terminal;
a speed of processing by said client terminal;
a time limit for access to said sequence part by the client terminal;
the occupancy rate of the communication network bandwidth;
a time of response by the server device to an elementary request submitted to him;
the presence of an error response of specific type by the server device to an elementary request submitted to it.

In an embodiment of the invention, the duration of the temporal sub-intervals corresponding to the elementary requests depends on the spatial accessibility of image data composing said video sequence.

"Spatial accessibility" refers to the concept whereby image data may be obtained independently from a greater or lesser number of other image data at the same point in time (that is to say depending on the presence of a greater or lesser number of "packets" or "slices" in the image).

As the resources necessary to manipulate image data (for example to decode them) depend on their dependencies (temporal and/or spatial), this provision makes it possible to take account of this criterion to choose optimally the decomposition adapted to the equipment and network involved.

In an embodiment of the invention, the video sequence being compressed using a temporal prediction mechanism, the duration of the temporal sub-intervals corresponding to the elementary requests depends on the period separating two images without temporal dependency in the video sequence, that is to say in particular between two consecutive "Intra" images.

In particular, at least one temporal sub-interval is aligned with images of the video sequence which are not compressed by temporal prediction. In other words, the intermediate times which define the temporal sub-intervals correspond to images without temporal dependency.

By way of example, they may be Intra images "I" in the MPEG-2 or MPEG-4 format or else IDR images in the H.264 format.

This provision makes it possible to simplify the operations of extraction at the server. This is because, in the absence of temporal dependency between two consecutive intermediate images, the server only has to be concerned with the extraction, and not with the possible spatial dependency.

It will moreover be noted that the determination of the intermediate times aligned with images without temporal dependency is of low cost since these images are very often indexed and easily detectable in the compressed sequence.

Furthermore, it may be provided that said initial time be offset to align with the last image of the video sequence that precedes said initial time and that is not compressed by temporal prediction. This simplifies in particular the determination of temporal sub-intervals aligned with Intra images by mere application of a synchronization distance provided in the sequence compressed.

In an embodiment, said decomposition comprises a step of performing linear interpolation, along a temporal axis, of at least one intermediate spatial region on the basis of said initial and final spatial regions. This mechanism enables simple definition of the region of interest tracked during its motion, so as to deduce therefrom the fixed spatial region for the needs of the invention.

In particular, said decomposition comprises the linear interpolation of two intermediate spatial regions corresponding to the two extreme times of a said temporal sub-interval. The extreme positions of the tracked region of interest are thus identified, to obtain a video fragment corresponding to a temporal sub-interval.

In particular, said fixed spatial region associated with said temporal sub-interval encompasses said corresponding two intermediate spatial regions. In particular, said fixed spatial region is formed from the minimum rectangle encompassing said two intermediate spatial regions. In this way, the fixed spatial region is easily constructed, while optimizing the quantity of data finally extracted.

Of course, geometric groups other than the rectangle may be implemented, in particular a circle or more complex shapes adapted to encompass several regions of interest.

As a variant of the linear interpolation, it may be provided that the decomposition comprises the following steps:
  determining at least one set of geometric data (for example a shape, an object, etc.) present in both the initial and final regions;
  estimating a variation (spatial movement and/or spatial deformation, of greater or lesser complexity: straight line, curve, etc.) of said set in said sequence between the initial and final times; and
  said fixed spatial region associated with an elementary request taking into account said estimation of variation.

This provision however requires more computations (for the estimation of a complex movement in particular), but however enables more precise tracking of the desired region of interest during each temporal sub-interval.

In an embodiment of the invention, said decomposition into elementary requests is implemented at a client terminal establishing said access request. In this case, the exploitation of the elementary requests may be their transmission to the server for the purposes of being executed.

This enables the client terminal to dynamically modify the temporal decomposition of the spatio-temporal part according to the accessibility of the stream, in particular reflected by the responses from the server.

As a variant, said decomposition into elementary requests is implemented at a server device storing said compressed video sequence. An example of exploitation may then be the execution of the elementary requests.

This enables the server to make provision, according to the computation capacities of various clients that may access the spatio-temporal part, for different decompositions into requests for elementary fragments.

Furthermore, in another approach, the server may thus publish the access (for example a link to a Web page) to that spatio-temporal part using a list of requests for elementary fragments. It is these requests which are then accessible to standard clients.

In this case, said server device makes available to a client terminal the list of said elementary requests. For the author of a video, this configuration enables easy sharing of sub-parts of it with other users.

In another variant, said decomposition into elementary requests is implemented at an intermediate device located on a communication network between a client terminal making said access request and a server device storing said compressed video sequence. The use of an intermediate device makes it possible to provide a solution for access to a video sequence spatio-temporal part, which integrates servers of fragments implementing the invention with standard servers of fragments. The intermediate device may, like the client, adapt the granularity of the requests according to the responses from the servers.

In particular, said intermediate device is a proxy which receives said access request from the client terminal, sends each of said elementary requests to said server device, stores each of the video fragments received from the server device and transmits a response to the access request from the client terminal that is established on the basis of said stored video fragments. This provision has a double advantage: of reducing the processing load at the client terminal, and also of storing, in temporary memory of the proxy, the responses to complex spatio-temporal requests with a view to responding more rapidly to future identical requests.

In an embodiment of the invention, the decomposition of the access request, in particular by said server device, comprises iteratively determining the duration of said temporal sub-intervals.

In particular, said iterative determining comprises iteratively sub-dividing the temporal sub-intervals for as long as the ratio between the estimated costs of transmitting the video fragments respectively corresponding to a sub-interval after iteration and to a sub-interval before iteration is less than a threshold value, generally a threshold with the value ½ when iterative division by 2 is carried out.

It is to be noted that when this determining is conducted on the server device, the estimated costs may be substantially the real transmission costs since it has available the video sequence to evaluate these costs. A better evaluation of the compromise between the number of requests and the quantity of data transmitted is thereby obtained.

When this determining is conducted on the client terminal or on the intermediate device, these costs may be estimated on the basis of external information, for example the compression rate over the desired sequence part.

In an embodiment of the invention, said plurality of elementary requests corresponds to a plurality of distinct temporal sub-intervals fully decomposing said temporal section. In this way, the group of fragments obtained constitutes the entirety of the desired part of the video sequence.

According to a particular feature of the invention, a said elementary request comprises at least one parameter defining the fixed spatial region, and a component representing a spatial variation of said fixed spatial region during said corresponding temporal sub-interval. The spatial variation in particular concerns a movement and/or a deformation of said fixed region. This provision provides a syntax that is simple (as close as possible to that provided for example in the "Media Fragments URI" recommendation) and efficient for accessing each elementary fragment of the spatio-temporal part to access.

In a complementary manner, the invention concerns a processing device for accessing a spatio-temporal part of a compressed video sequence on the basis of an access request, said access request identifying a temporal section defined between an initial time and a final time in said sequence, characterized in that:

said access request furthermore identifies an initial spatial region of the sequence at the initial time, and a final spatial region of the sequence at the final time that is different from said initial spatial region;

and the device comprises:

a decomposition module adapted for decomposing said access request into a plurality of elementary requests for access to a video fragment of the sequence, each elementary request identifying a fixed spatial region to extract in a temporal sub-interval of said temporal section; and a module for exploiting at least one elementary request to access at least one video fragment constituting said spatio-temporal part to access.

The access device has similar advantages to those of the method set forth above, in particular of accessing, at optimized costs, a part of the video sequence by tracking a region of interest which may vary and move over time.

Optionally, the device may comprise means relating to the features of the method set out above.

The invention also concerns a system for accessing a spatio-temporal part of a video sequence stored on a server device, comprising:

an access device as described above;
a client terminal provided with means for establishing said access request; and
a server device storing said video sequence and adapted to process at least one said elementary request to extract at least one video fragment constituting said spatio-temporal part to access.

The invention also concerns an information storage means, possibly totally or partially removable, that is readable by a computer system, comprising instructions for a computer program adapted to implement a method in accordance with the invention when that program is loaded and executed by the computer system.

The invention also concerns a computer program readable by a microprocessor, comprising portions of software code adapted to implement a method in accordance with the invention, when it is loaded and executed by the microprocessor.

The information storage means and computer program have features and advantages that are analogous to the methods they implement.

Still other particularities and advantages of the invention will appear in the following description, illustrated by the accompanying drawings, in which:

FIG. 9 illustrates, in flow diagram form, steps of an implementation of the invention when the decomposition of the requests is carried out at the server device of FIG. 2;

FIG. 14 illustrates examples of possible syntax when the decomposition of the requests is carried out at the intermediate node.

Figure 2:
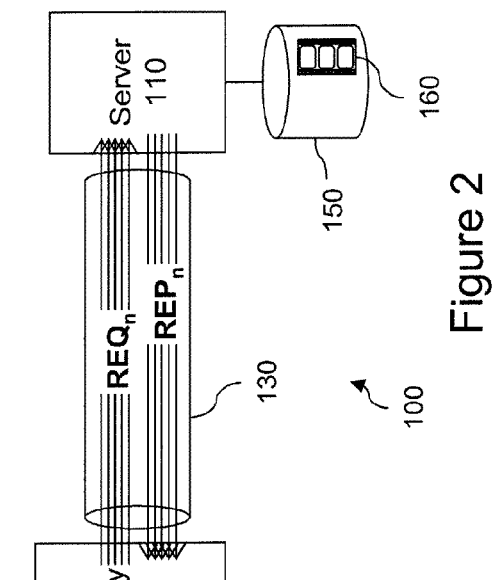
FIG. 2 represents an example of a system for the implementation of the invention.

As represented in FIG. 2, an example of a system 100 for the implementation of the invention comprises a server 110 linked to a client terminal 120, via a communication network 130 and possibly a proxy 140. Other client terminals (not represented) may be connected to the same network 130.

The communication network 130 may be of any nature, wired or wireless, mobile phone based or computer based such as the Internet.

According to the case concerned, the server 110 may be a web server which a user accesses using a mobile terminal 120 (telephone, personal digital assistant, etc.) or a fixed terminal (computer, television set equipped with Internet access).

In a multimedia application, the server 110 may be merely a fixed video camera or in a network, a portable video camera or a video server.

The server 110 stores, in a multimedia database 150, video sequences 160 that are compressed to reduce the costs of storage and distribution. The video sequences 160 have in particular been compressed using temporal and spatial prediction mechanisms. In what follows, any image coded independently of the other images of the same sequence is termed "synchronization image". This is the case for example of the "Intra" images in MPEG-1, 2 or 4, or the "IDR" or "SI" images in H.264.

These images may be decoded by themselves, without needing the other images of the compressed video sequence. Thus, they enable a video decoder to begin to play the video sequence at a given time.

From this definition also arises the definition of "synchronization distance" which represents the time interval separating two synchronization images of the same video sequence. Generally this distance is constant in the sequence. It may be expressed in milliseconds or seconds or even in images when the frame rate is known.

The invention concerns in particular the access, by the client terminal 120, to a spatio-temporal part of the video sequence 160 stored on the server device 110. A spatio-temporal part results in particular from spatial filtering over target spatial regions of the images of the video sequence and of possible temporal filtering by applying the spatial filtering solely to a temporal section of the video sequence.

The client terminal 120 (and/or the proxy 140 the case arising) and the server device 110 are equipment that implement the "Media Fragments" mechanisms for addressing and communicating (request/response) as introduced previously. In this context, the client terminal 120 (or the proxy 140) is an apparatus sending elementary requests in accordance with the "Media Fragments URI" recommendation (under the W3C specification) and receiving the fragments extracted by a Media Fragments server. Similarly, the server device 110 is an apparatus adapted to process Media Fragments requests and to return binary data corresponding to those requests.

Figure 3:
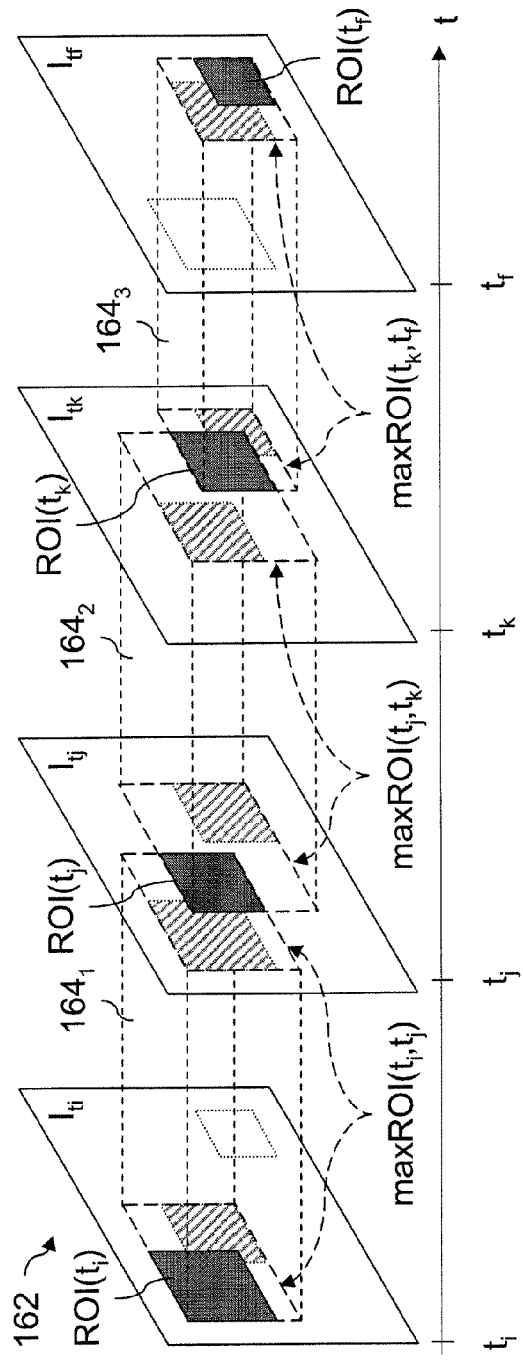
FIG. 3 illustrates the access to a part of a video sequence by a method according to the invention.

FIG. 3 provides a diagram of an example of a spatio-temporal part 162 to access in the video sequence 160, defined by two times, initial $t_i$ and final $t_f$ temporally delimiting that part in the sequence ($t_0$=0 s being for example the start of the sequence), and by two spatial regions in the images at these two initial and final times.

In particular, in the initial image $I_{ti}$, the region of interest (or "ROI") is defined by a grayed horizontal rectangle ROI($t_i$), while in the final image $I_{tf}$, the region of interest is defined by a rectangle ROI($t_f$), also grayed. Other shapes of region of interest may however be used.

These four items of information ($t_i$, $t_f$, ROI($t_i$), ROI($t_f$)) defining the part to access are in particular specified by a user at the dedicated interface on the client terminal 120.

According to an embodiment of the invention, the client terminal 120 establishes a request for access REQACC to that part by identifying the temporal section of said sequence, defined between an initial time $t_i$ and a final time $t_f$, and the regions of interest including the initial spatial region ROI(L) at the initial time, and the final spatial region ROI($t_f$) at the final time, this latter being different from said initial spatial region such that the region of interest for the user moves in the part of the sequence of interest to him.

As shown conjointly in FIGS. 2 and 3, this access request REQACC is decomposed or converted into a plurality of elementary requests $REQ_n$ for access to a video fragment 164 of the sequence 160, each elementary request identifying a fixed spatial region maxROI($t_n$,$t_{n+1}$) to extract in a temporal sub-interval [$t_n$, $t_{n+1}$] of said temporal section [$t_i$, $t_f$]. Next at least one elementary request $REQ_n$ is exploited, for example sent by the client terminal or processed at said server device, to extract at least one video fragment 164 constituting said part to access.

The extracted fragments may then be sent back, in the form of elementary responses $REP_n$, and grouped together to form the part to access 162 returned to the client terminal 120 in the form of a response REPACC.

In the example of FIG. 2, this decomposition may be carried out at the proxy 140. However, as will be seen subsequently, other embodiments may be envisaged, such as an implementation on the server 110 or preferably on the client terminal 120.

In the example of FIG. 3, the access request REQACC has been decomposed into three elementary requests $REQ_n$, each in accordance with the Media Fragments URI recommendation. These three elementary requests respectively address the three following temporal sub-intervals: [$t_i$, $t_j$], [$t_j$, $t_k$] and [$t_k$, $t_f$], and the three fixed spatial regions: maxROI($t_i$,$t_j$), maxROI($t_j$,$t_k$) and maxROI($t_k$,$t_f$), as described later and defined on the basis of the grayed intermediate spatial regions ROI($t_j$) for the time $t_j$ and ROI($t_k$) for the intermediate time $t_k$.

The three fragments then obtained are the fragments identified as $164_1$, $164_2$ and $164_3$. The desired part 162 which is returned to the client terminal 120 is thus constituted by these three fragments. It is thus noted that in the first instance, the invention enables the quantity of image data transmitted to be considerably reduced relative to a conventional approach using Media Fragments requests (the sum of the volumes of the parallelepipeds $164_n$ is very appreciably less than the volume of the parallelepiped of FIG. 1).

As also described later, in an embodiment, the invention furthermore makes it possible to optimize the volume of video data exchanged between the client and the server, by dynamically adjusting the decomposition of the access request REQACC during the processing of elementary requests, and in particular the duration of the temporal sub-intervals.

Figure 4:
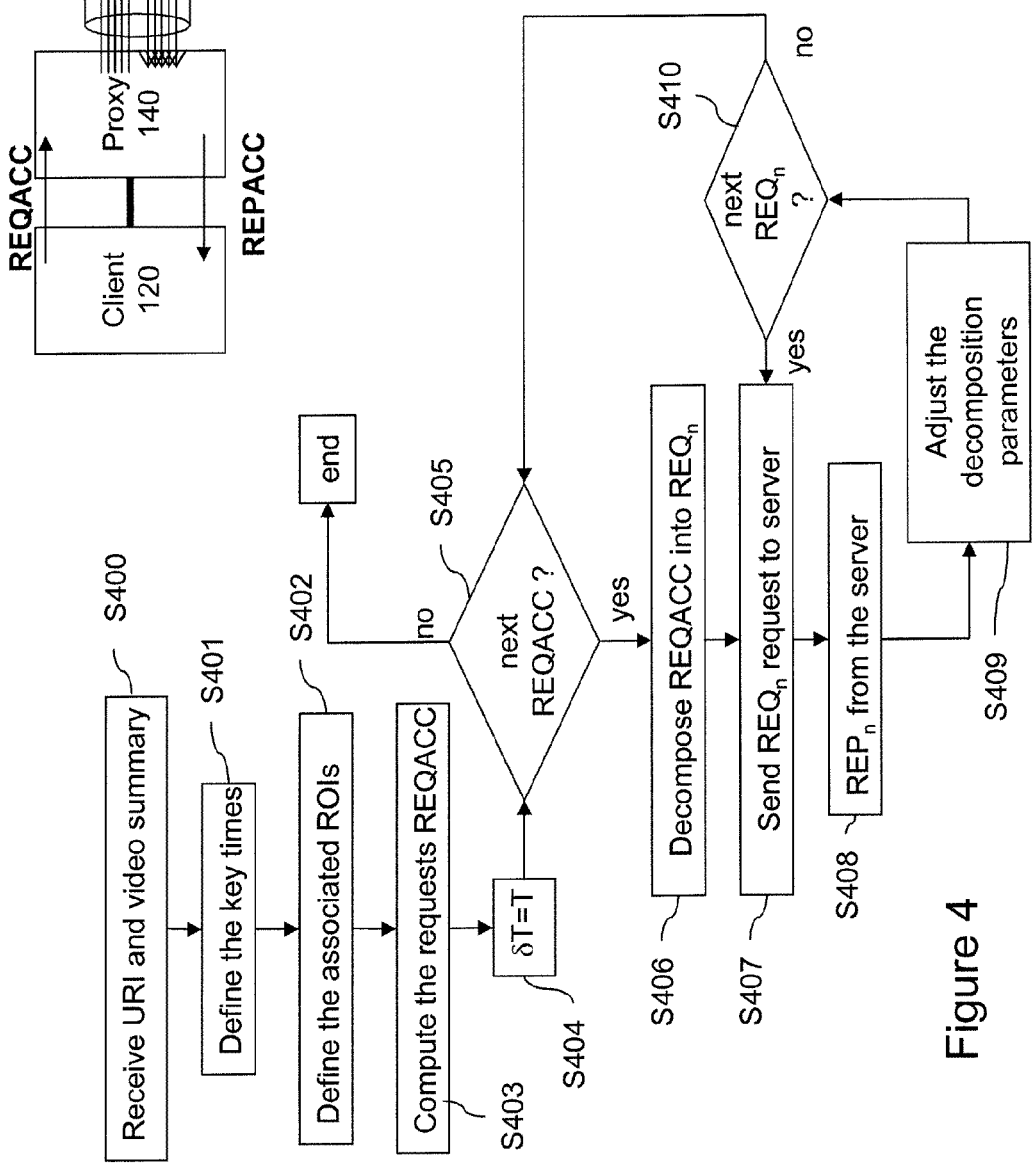
FIG. 4 illustrates, in flow diagram form, general steps of the present invention.
Figure 5:
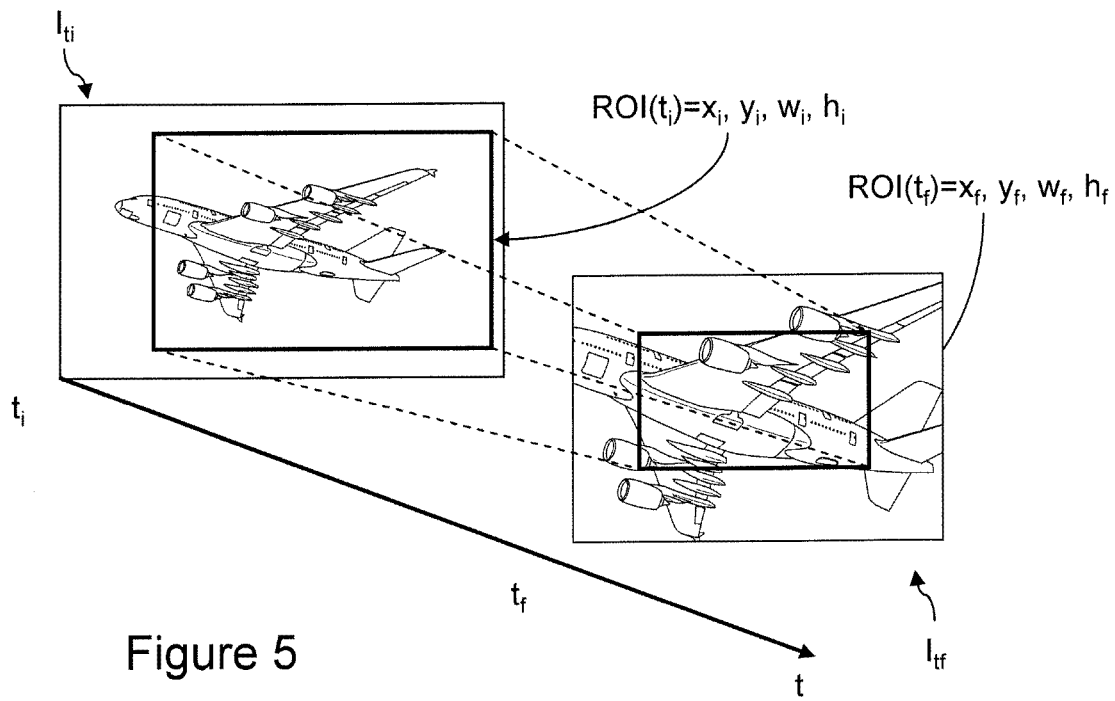
FIGS. 5 and 6 illustrate the implementation of the steps of FIG. 4 via an example.
Figure 6:
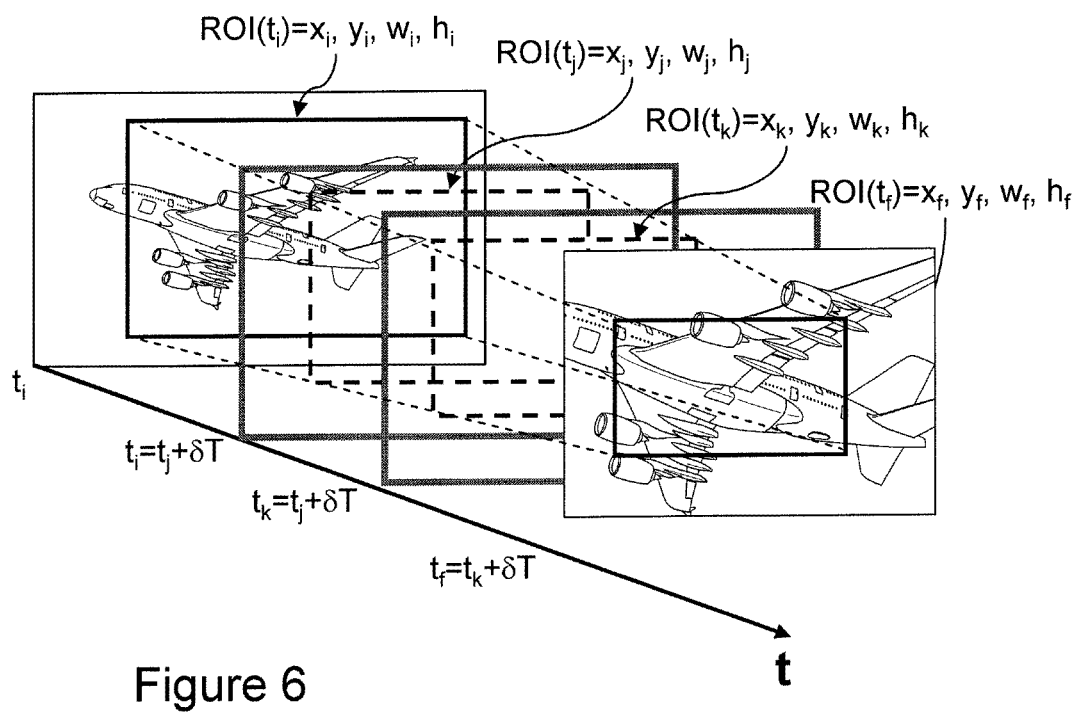

FIGS. 4 to 6 illustrate in more detail an embodiment of the invention, using an example in which, at the step S400, a user receives on his communicating device (PC, mobile telephone, etc.), an address in URI form of a video 160 (FIG. 6) produced by one of his friends as well as a summary (FIG. 5) of that video.

This summary may be in the form of a video of very low resolution and/or of very low quality, or in the form of a series of key images such as those represented in FIG. 5.

On the basis of the summary and a graphical interface (not represented), the user may request access, by extraction, to a part of the video 160 of his choice, by defining key times $t_i$ and $t_f$ (step S401) and for each key time the associated region of interest (step S402), i.e. respectively ROI($t_i$) defined by the information $x_i$, $y_i$, $w_i$ and $h_i$, and ROI($t_f$) defined by the information $x_f$, $y_f$, $w_f$ and $h_f$. In the Figure, only two key times have been represented. Of course, a greater number of such times and their associated regions of interest will generally be defined by the user, the temporal sections then being processed in turn. In particular, care could be taken to choose key times that are not too far apart (of the order of a few times the synchronization distance), in order for the movement between the regions of interest defined over a temporal section to be able to be assimilated to a linear movement. In this way, the implementation of a linear interpolation as described below will not introduce too many errors.

The user next clicks on a "download" button of the interface. The processing of the present invention may then be implemented to take on the task of retrieving the video data so selected.

For this, at the step S403, the client terminal 120 translates the series of key times into a series of complex spatio-temporal requests REQACC for access to the video stored at the address represented by the URI. It may be recalled that these requests specify two items of temporal information $t_i$ and $t_f$ and two associated items of spatial information, ROI($t_i$) and ROI($t_f$), corresponding to two successive key times.

In the embodiment now described, the client terminal 120 incorporates a decision module which operates for the decomposition of these REQACC requests according to the invention.

As, on starting up, this module has very little or no information as to the video format and the possibilities of random access in the video (that is to say the presence and the frequency of synchronization images), it initializes a downsampling factor "δT" to an initialization value (step S404). The object of this downsampling factor is to indicate the duration of the temporal sub-intervals on the basis of which will be created the elementary requests in accordance with the Media Fragments URI recommendation. Below, "δT" will be designated in the same way by the term "factor" or "duration".

Figure 1:
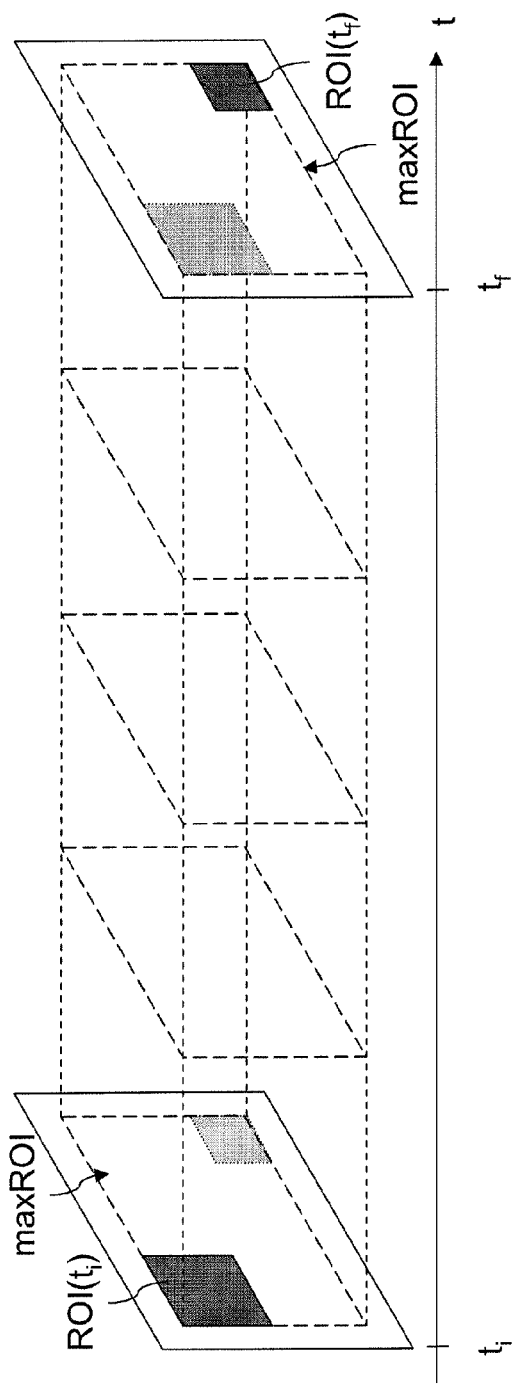
FIG. 1 illustrates the access to a part of a video sequence using the mechanisms of the W3C recommendation on media fragments.

According to the level of prior knowledge of the video format possessed by the decision module, the factor δT may take several initial values:

δT=1 second where the client terminal 120 has no indication as to the video stream;

δT takes a value of time such that the decomposition of the regions of interest ROI makes it possible to obtain a reduction in volume of the higher data at a certain threshold considered to be significant, for example a factor of 2 (comparing for example the volumes of FIGS. 1 and 3);

δT=synchronization distance of the video 160, if the client terminal 120 was able to obtain that information, through knowledge for example of the images without temporal dependency.

However, if a complex request REQACC has already been processed, the last δT factor used for that processing may be kept to begin the decomposition of the following complex request.

The processing continues at step S405 at which the decision module retrieves the following complex request from the list of complex spatio-temporal requests. At the first iteration, the decision module retrieves the first complex request, i.e. that which corresponds to the time interval between the first key image ($I_{ti}$) and the second key image ($I_{tf}$), as well as to the associated spatial regions ROI($t_i$) and ROI($t_f$).

This request REQACC is decomposed, at step S406, into a series of elementary requests REQ$_n$ over time intervals [$t_n$, $t_{n+1}$=$t_n$+δT] as illustrated in FIG. 6 for n=i, j and k. It is to be noted that according to the value of δT, the final time $t_f$ does not necessarily satisfy $t_f$=$t_{f-1}$+δT.

In particular, the intermediate times $t_n$ are chosen in order for them to be aligned with the images without temporal dependency, for example with Intra images explicitly indexed in an MPEG-2 or MPEG-4 stream. This choice simplifies the processing operations to perform on the server.

It is implemented in particular where the synchronization distance is known.

Moreover, in an embodiment, the initial time $t_i$ indicated by the user is offset to a preceding time aligned with the last image without temporal dependency (Intra image). Thus, the following intermediate images $t_n$ automatically fall on images without temporal dependency since the temporal section to access is decomposed into multiples of the synchronization distance.

It is to be noted that an offset of $t_f$ towards the Intra image following the portion indicated by the user is possible. However, the absence of offset is not detrimental, the last sub-interval created then containing fewer images than the previous ones.

A decomposition example is described in more detail below with reference in particular to FIG. 10.

As a result of this decomposition, at the intermediate times $t_n$ so obtained, the processing determines an intermediate region of interest ROI($t_n$) (see FIG. 3 for example, or the region $x_j$, $y_j$, $h_j$ in FIG. 6) in each of the intermediate images $I_{tn}$. This determination may simply rely on a linear interpolation, along the temporal axis, between the initial and final regions of interest ROI($t_i$) and ROI($t_f$).

At the step S407, the client terminal 120 next exploits these standard requests REQ$_n$ to which has been given the form URI#t=$t_n$,$t_n$+δT&xywh=maxROI($t_n$,$t_n$+δT), with $t_n$ comprised between $t_i$ and $t_f$ of the current request REQACC, by sending them to the server 110. In each of these requests, the spatial region defined by maxROI($t_n$,$t_n$+δT) is fixed, which ensures that these requests are in accordance with the Media Fragments URI recommendation.

As illustrated in the example of FIG. 3, maxROI($t_n$,$t_n$+δT) is a rectangle encompassing the regions of interest ROI($t_n$) and ROI($t_n$+δT), in particular the smallest rectangle encompassing these regions. Other shapes for this fixed spatial region may however be used, in particular depending on the shapes of the regions of interest.

At step S407, the decision module thus sends an elementary request to the server 110, in the temporal order of the requests.

Further to step S407, the server 110 also exploits the elementary request REQ$_n$ received by executing it to extract the corresponding fragment 164$_n$, then sends back to the client 120, either the corresponding binary data or a super-set of those data (in particular by extracting the entirety of the "slices" concerned in the request), or an error message, at step S408.

The response REP$_n$ from the server 110 is next analyzed at S409 in order to adjust the temporal downsampling factor δT, as described below with reference to FIG. 7.

The adjustment of this factor δT and thus of the duration of the temporal sub-intervals [$t_n$, $t_n$+δT] may depend on a performance criterion of the client terminal 120 and/or of the server device 110 and/or of the communication network 130, and in particular on the following criteria:

the available computation capacity on the client terminal;
a priority value associated with the client terminal;
a speed of processing by said client terminal;
a time limit for access to said sequence part by the client terminal;
the occupancy rate of the communication network bandwidth;
a time of response by the server device to an elementary request submitted to him;
the presence of an error response of specific type by the server device to an elementary request submitted to it;
the accessibility of the video sequence or the spectral granularity of the video data in the sequence (in particular the dimension of the slices in the images or the synchronization distance).

Further to this adjustment, the client terminal 120 determines (test S410) whether there is still an elementary request REQ$_n$ to be processed.

In the affirmative, the client terminal 120 sends the following elementary request REQ$_n$ at step S407.

In the negative, the client terminal 120 considers the following complex request REQACC by returning to step S405 and loops again on the steps of decomposition and analysis so long as the last complex request has not been reached.

Figure 7:
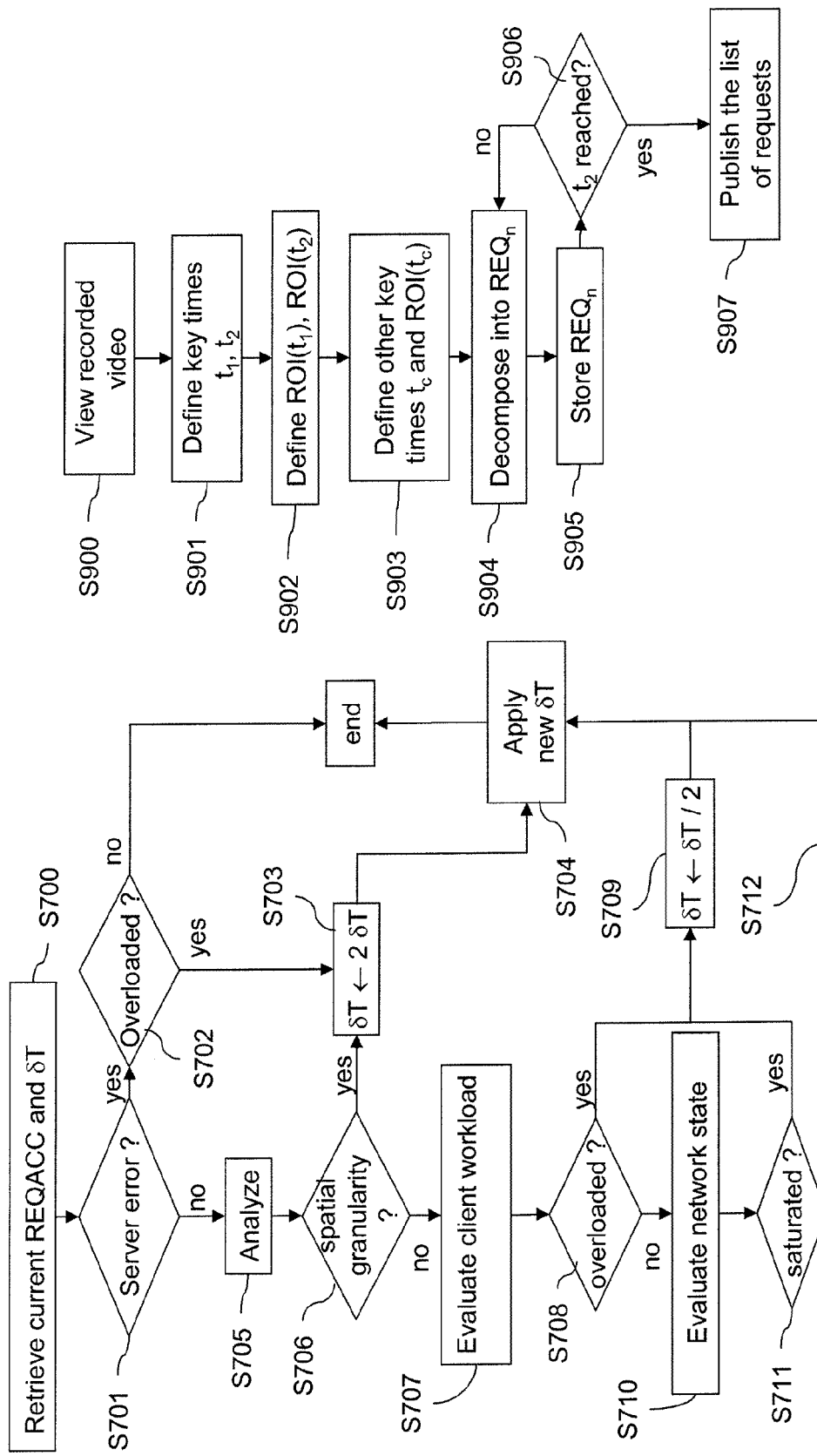
FIG. 7 illustrates, in flow diagram form, steps for the adjustment of decomposition parameters for complex requests, in an embodiment in which this processing is carried out at the client terminal of FIG. 2.

With reference to FIG. 7, a description is now given of processing for adjustment of the decomposition parameters for the complex requests REQACC, in a preferred embodiment in which this processing is carried out at the client terminal 120.

Of course, this processing may also be carried out on the server device 110 as described below, or even at the proxy 140 as also mentioned below.

The processing commences by a step S700 of initializing the decision module, consisting of retrieving the current duration δT as well as the current complex request REQACC and the response REP$_n$ from the server 110 to the last elementary request REQ$_n$ processed if it exists.

Step S701 makes it possible to test whether the response REP$_n$ from the server 110 is an error message.

If that is the case, the decomposition of step S406 may be called into question and performed again depending on the type of error.

In this case, the client terminal 120 determines (test S702) whether the server 110 is overloaded, that is to say whether the processing resources are overloaded with regard to properly processing the elementary requests REQ$_n$ not yet processed or sent.

To perform this test, the client terminal 120 relies on the HTTP communication protocol. To be precise, in accordance with the Media Fragments URI recommendation, the $REP_n$ responses are generally based on the HTTP protocol. In this case the conventional error codes are the 5xx codes defined by that same HTTP protocol and more particularly the codes 500 "Internal Server Error" and 503 "Service Unavailable".

If the server replies with the error 500 "Internal Server Error" the decision module then has no precise information on the problems that exist at the server 110. If the preceding elementary requests did not fail (that is to say that it did indeed receive the video fragments corresponding to those preceding requests), it may thus consider that the server 110 is becoming overloaded, and thus that the test S702 is true.

Similarly, if on reception of an error response 503 "Service Unavailable", the "Retry-after" header is present in that response, the test S702 is then considered as true.

In this case (output "yes" from test S702), the decision module increases the duration $\delta T$ at the step S703, for example by doubling it, which leads to a new computation of the elementary requests $REQ_n$ of the current complex request REQACC (step S704), but uniquely for the elementary requests not yet sent, that is to say generally for the temporal subsection $[t_\alpha, t_f]$, if $REQ_\alpha$ is the last request processed. This re-computation applies the same mechanisms as those provided at step S406, i.e. determining the intermediate times $t_n$ with the new value $\delta T$, then the intermediate regions of interest $ROI(t_i)$ and lastly the fixed spatial regions $maxROI(t_n, t_{n+1}=t_n+\delta T)$ between two consecutive intermediate times.

On the other hand, if no indication is given by the server 110, the test S702 may then be considered as false, and the decision module leaves the factor $\delta T$ unchanged. It then proceeds to the following step S410.

If the response $REP_n$ is not an error message (test S701 false), the headers of that response as well as the response times are analyzed at step S705 in order to know whether or not the server 110 was precisely able to extract the data from the video fragment concerned in the request $REQ_n$, and whether or not it is overloaded.

For this, the client terminal 120 analyses the values of the "Content-Range" HTTP headers of the response $REP_n$ from the server 110, and compares them with the "Range" headers (in particular the values representing the spatial part of the video fragment) of the request $REQ_n$ sent by the client 120.

Because the server extracts the data from the images by whole slices to simplify its processing, the values returned by the server reflect, indirectly, the structuring of the images in slices. Thus the separation between these values is a good indication of the accessibility level of the stream, in particular in terms of spatial granularity (test S706).

The closer these values, the greater the precision with which the server 110 is capable of extracting the fragments. Conversely, the greater the separation, the more the client 120 will be called upon to extract the relevant data from the response (the entire slices returned).

This is why, in case of low spatial accessibility (test S706 false), a performance criterion of the client terminal 120 is evaluated at S707 then compared to a threshold at S708 in order to determine whether it has sufficient resources and/or capacities available to extract the relevant data.

The performance criterion of the client terminal may in particular consist in an evaluation of the workload of that terminal, that is to say the level of occupancy of internal resources (for example the processor, the random access memory, etc.), but also in an evaluation of a level of priority attributed to said terminal, of a processing speed or of a downloading time limit entered by the user.

In case of low performance of the client terminal 120 (overload, output "yes" from test S708), the decision module reduces the duration $\delta T$ of downsampling, for example by half and/or by maintaining the alignment on the images without temporal dependency, at step S709. This is followed by updating of the elementary requests $REQ_n$ of the current complex request REQACC, by computing them again using the new period $\delta T$, but uniquely for the requests not yet processed.

This reduction in particular makes it possible, ultimately, to have a greater number of elementary requests $REQ_n$, and thus to obtain more precise fragments $164_n$. The processing load then on the client terminal is lower.

If the client terminal 120 is not overloaded (test S708 false), the decision module evaluates the load of the communication network 130, at the step S710. For this, the decision module keeps statistics (response time to a ping command, occupancy of the bandwidth [estimated for example by a ratio between the number of bytes received in response to a request and the time elapsed between sending that request and the response to it]) on the volume of the data exchanged and periodically evaluates the bandwidth available for the client terminal 120.

At test S711, the decision module determines whether the network is overloaded or saturated, by comparison of the statistics and/or bandwidth with threshold values.

In case the network is underused (output "no" from test S711), the decision module tends to give preferential treatment to the less frequent and less precise requests by increasing the duration $\delta T$, at the step S712.

Conversely, if the network is saturated (output "yes" from test S711), the decision module will seek to send a greater number of more precise requests, by reducing the duration $\delta T$ (step S709).

Further to these updates of the duration $\delta T$, the decomposition of the current complex request REQACC is re-computed for the remaining elementary requests at S704, and this new duration $\delta T$ is henceforth considered for the future decompositions (step S406).

It is to be noted that the updating of the duration $\delta T$ may also be implemented in the form of a linear function of the characteristics (in terms of computational power) of the client terminal 120 and/or of the bandwidth of the communication network 130 between the client and the server.

Figure 8:
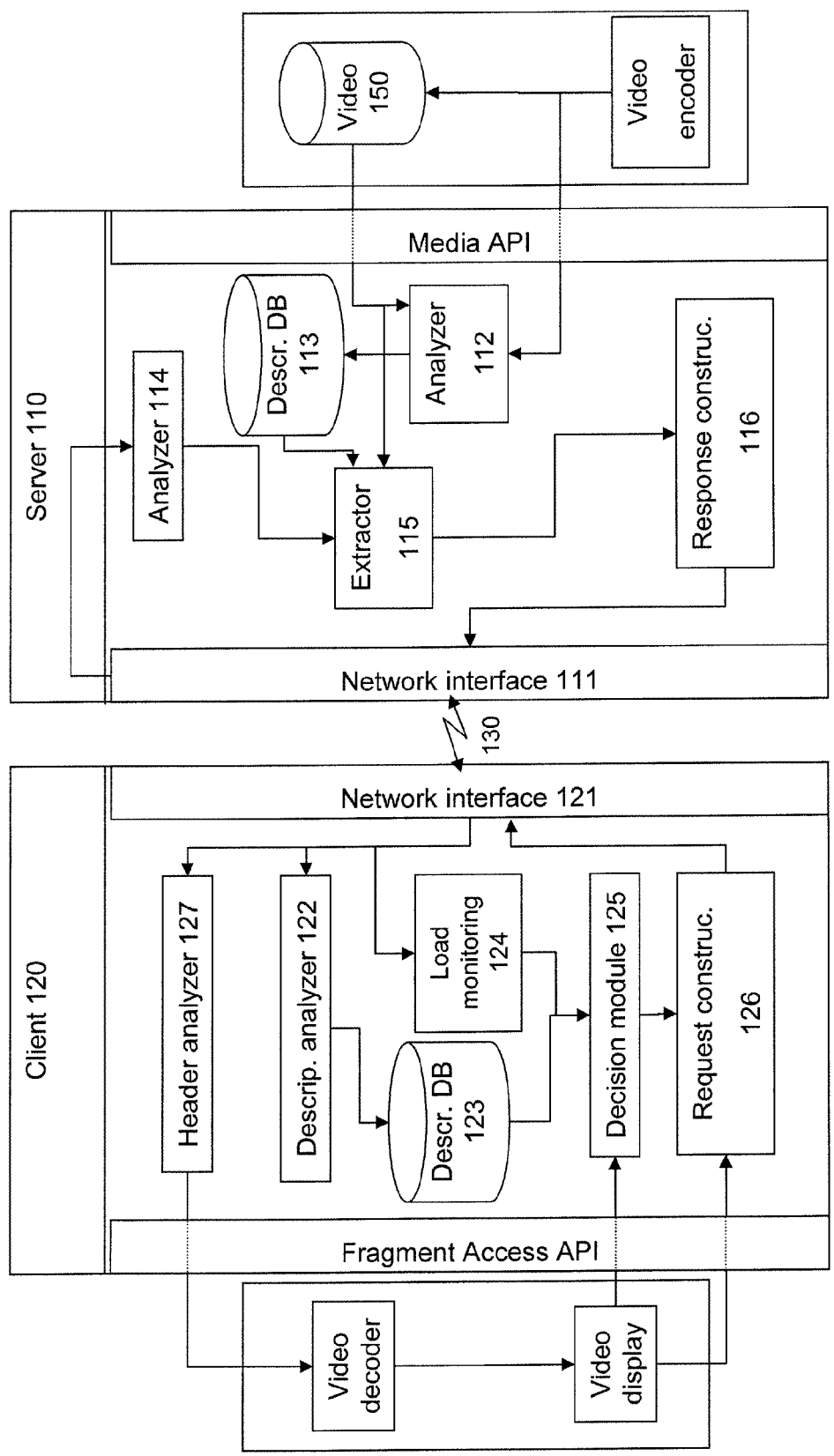
FIG. 8 is a diagrammatic representation of a client terminal and of a server device for an implementation of the invention.

FIG. 8 diagrammatically illustrates a client terminal 120 and a server device 110 for this implementation of the invention.

These two items of equipment possess a network interface (respectively 121 and 111) with the communication network 130, so as to be able to communicate requests and responses in accordance with the Media Fragments URI recommendation.

The client terminal 120 also comprises a video stream description analyzer 122 by which it obtains an identification of a video sequence 160 to process, a description of the key times ($t_n$) and of the regions of interest ($ROI(t_n)$) specified by the user. All this information is stored in a database 123. It also comprises a module 124 for load analysis with regard to the use of the internal resources of the terminal 120, of the network 130 and of the server 110 by analysis of the responses $REP_n$.

The decision module mentioned above is represented here by the module 125 and, using the information in the database 123 and from the load analysis, produces complex requests REQACC then decomposes (possibly a simple update) those requests into elementary requests $REQ_n$.

These latter are formed at the construction block 126 before transmission to the server 110 by the interface 121.

The responses $REP_n$ received are analyzed by the module 127 in order to provide the data from the video fragments to a video decoder, internally or externally of said client terminal 120.

For its part, the server 110 is linked to a device 150 for storage of the video sequences 160, which may possibly be equipped with a video encoder.

These video sequences are analyzed by an analysis module 112 to obtain a video stream description which is then stored in a database 113.

The requests $REQ_i$ received via the interface 111 are analyzed by the module 114, to obtain in particular the temporal interval concerned and the fixed spatial region to extract.

Based on this information, description data in the database 113 and video data in the device 150, a fragment extraction module 115 extracts the fragments concerned in the requests received.

A response construction module 116 retrieves these fragment video data and arranges them in the form of a response $REP_n$ in accordance with the Media Fragments URI recommendation, to be transmitted to the client 120.

With reference to FIG. 9, a description is now given of an embodiment of the invention in which said decision module 125 is implemented in the server 110. This embodiment makes it possible for example in particular for the author of a video to share sub-parts thereof with other authors.

For this, at step S900, the user-author views the video 160 he has just recorded. He selects passages of interest therefrom at S901 by specifying an initial time $t_1$ and a final time $t_2$, then frames the regions of interest $ROI(t_1)$ and $ROI(t_2)$ at S902.

At step S903, the user may specify other key times $\{t_c\}$ in the selected passage, in particular if the latter is very long and if the regions of interest vary greatly. The key times are in particular chosen aligned with images of the video sequence which do not have temporal dependency. On this occasion, he also specifies the regions of interest $ROI(t_c)$ for each of these key times, on which will be based the interpolation of the intermediate regions ROI and the decomposition.

As input to the step S904, a list is thus available of temporal sections $[t_i, t_f]$ and of associated regions of interest $ROI(t_i)$ and $ROI(t_f)$, with LA, or $t_i$ and $t_f=t_c$ or $t_2$. This list is equivalent to an aforementioned list of complex requests REQACC.

It is to be noted, as a variant, that this information may be sent by a client terminal to the server, in a REQACC request format as explained below with regard to FIG. 13.

Figure 10:
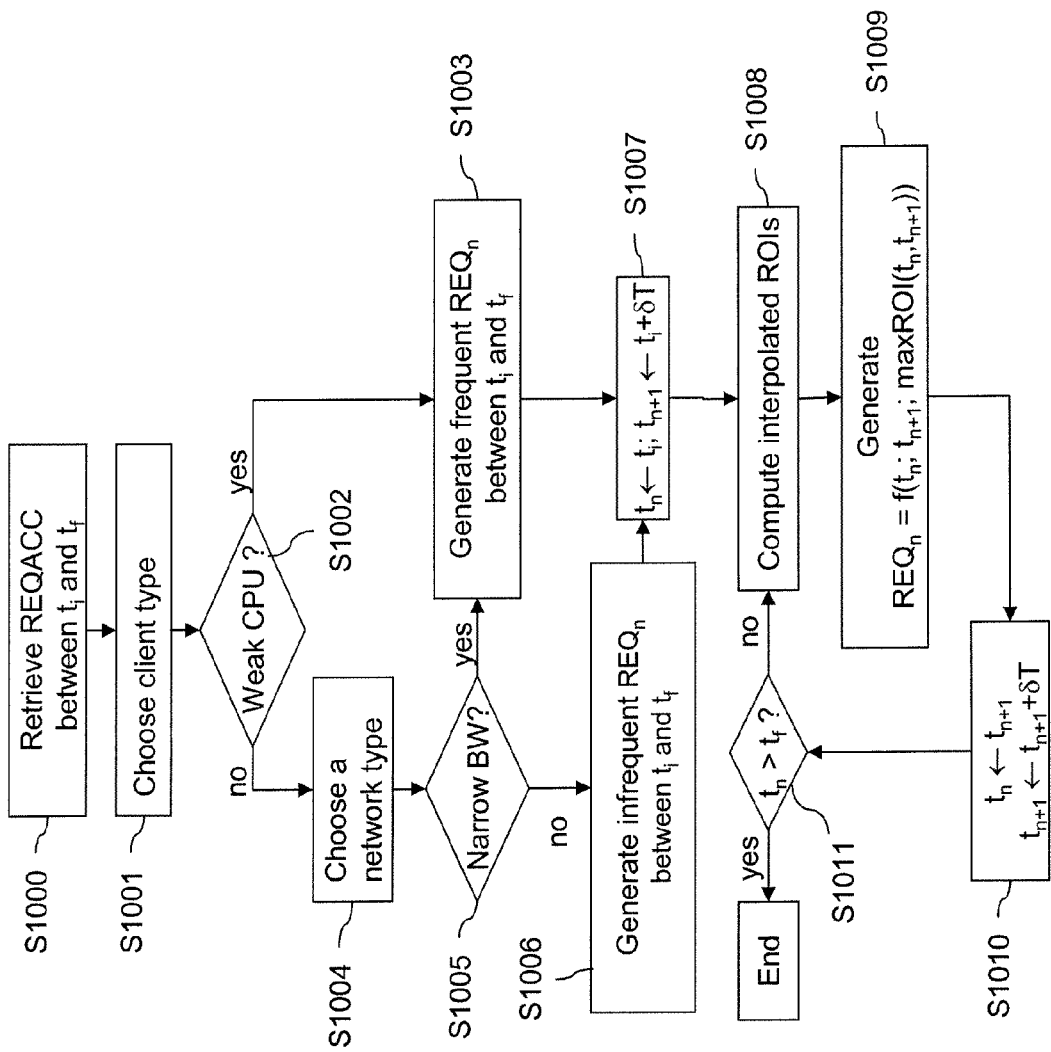
FIG. 10 illustrates in more detail, in flow diagram form, steps of adjusting parameters for decomposition at the steps of FIG. 9.

Step S904, described in FIG. 10, then consists of translating one of these temporal sections and associated regions of interest into a series of elementary requests $REQ_n$ in accordance with the Media Fragments URI recommendation.

The list of elementary requests thus produced is temporarily stored on the server 110 at step S905.

Step S906 enables each of these temporal sections to be processed successively, until the final time $t_2$ is reached.

When the last temporal section has been processed (S906 true), the list of elementary requests enabling each spatio-temporal part 162 of the video to be obtained is then exploited by the server, here published (step S907) to be made available and communicable to any user/device wishing to retrieve the new video so obtained.

For example, the user may send this list of requests by email to his friends in the form of a playlist. This list, which is loaded onto a video sharing server on the Web at the same time as the video itself, thus enables any client 120 connecting to that sharing server, to play or download that subset of the video.

Furthermore, if the author of the video only wishes to publish the spatio-temporal part (and not the whole video) on a video sharing Web server, also client terminal 120, the latter may easily download the fragments 164 composing that video part, so avoiding the author having to load the whole of his video on the sharing server.

Figure 11:
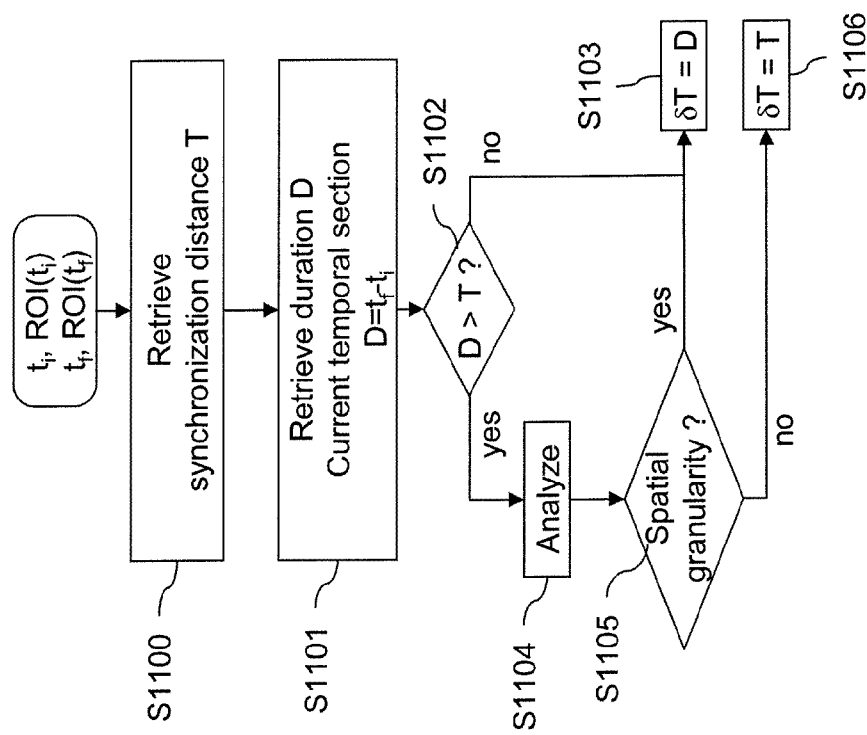
FIG. 11 illustrates, in flow diagram form, steps of generating elementary requests, implemented at the time of a particular processing operation of FIG. 10.
Figure 12:
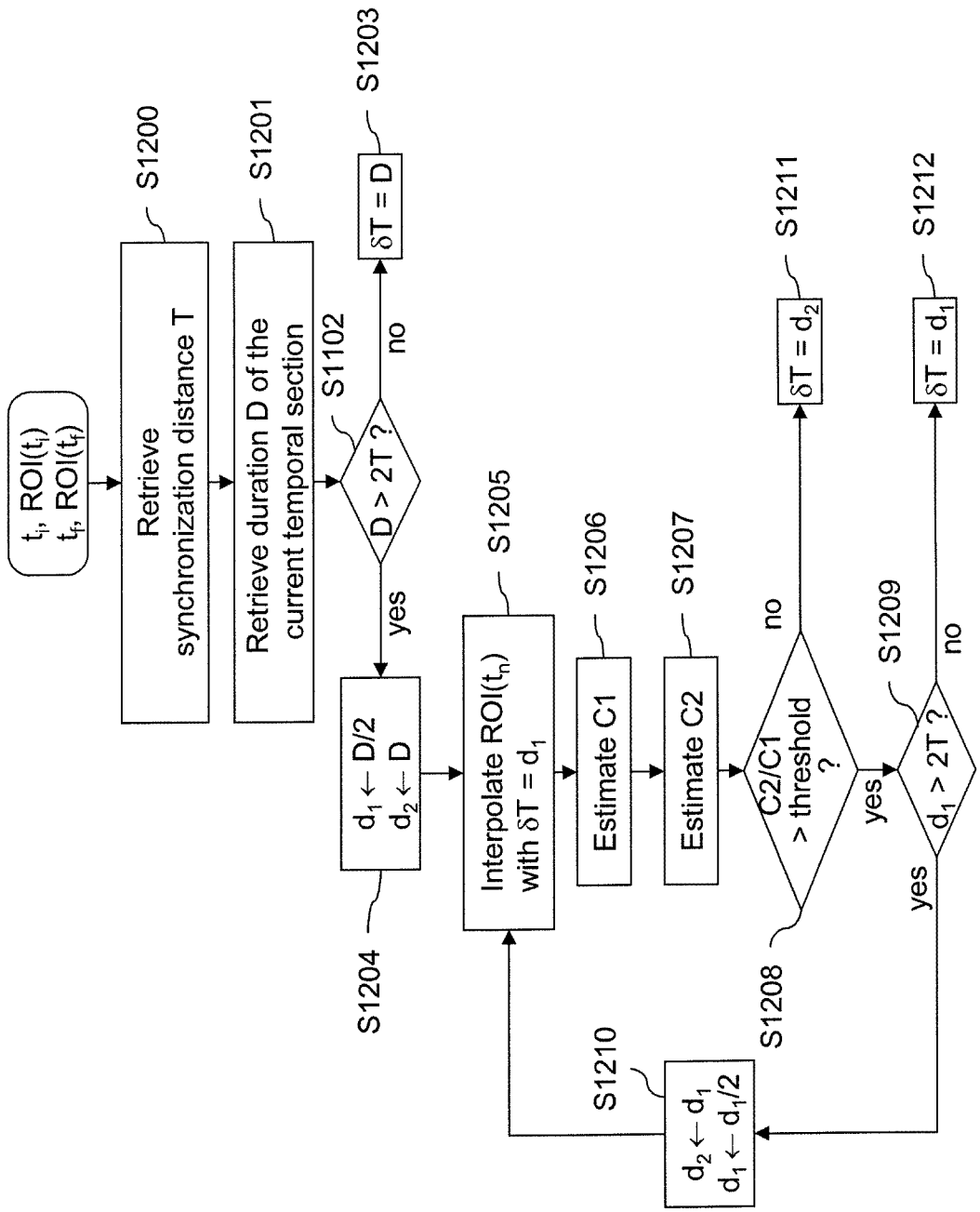
FIG. 12 illustrates, in flow diagram form, steps of generating elementary requests, implemented at the time of another processing operation of FIG. 10.

With reference to FIGS. 10 to 12, a description is now given of step S904 of decomposing the spatio-temporal requests REQACC into elementary requests $REQ_n$.

The first step S1000 consists, for the decision module of the server 110, of retrieving the times $t_i$ and $t_f$ delimiting the current temporal section as well as the associated regions $ROI(t_i)$ and $ROI(t_f)$.

Next, at S1001, the server selects, from a predefined list, what type of client 120 he wishes to exchange his video with (mobile telephone, PC, Web server, etc.). This predefined list classifies the types of clients 120 according to their computation/processing capacities.

A quick analysis of the capacities of the type of client chosen is carried out at S1002, by comparison for example with predefined threshold values.

It the type is a type of client with limited computation capacities (test S1002 true), the server 110 then generates elementary requests over short intervals of time ($\delta T$ small) with more precise regions of interest ROI at S1003. To be precise, as the client terminal 120 will not necessarily be able to process a high volume of data, the video fragments that will be sent are made as precise as possible.

FIG. 11 illustrates an embodiment of this step S1003 during which a complex spatio-temporal request REQACC is decomposed into elementary requests $REQ_n$ over a small time interval ($\delta T$ small) and over which the same fixed spatial region applies.

For this processing, the decision module 125 commences by retrieving, at S1100, the synchronization distance T of the recorded video.

At 1101, it retrieves the initial and final times $t_i$ and $t_f$ corresponding to the current complex spatio-temporal request to determine the duration D of the temporal section corresponding to that current request.

The test S1102 compares this duration D to the synchronization distance T.

If the duration D of the temporal section is equal to or less than the synchronization distance T, the decision module 125 sets $\delta T=D$ at S1103. This means that the temporal section is not decomposed into sub-intervals. In this case, a Media Fragments URI compatible request is nevertheless formed between the times $t_i$ and $t_f$ for the spatial region $maxROI(t_i,t_f)$.

If the duration D of the temporal section is greater than the synchronization distance T, the server then analyses (S1104) the video stream in terms of spatial accessibility (organization of the packets/slices enabling the synchronization; size of those packets/slices; number of packets/slices per image; etc.).

The higher the number of slices (output "yes" from test S1105), the better is the spatial accessibility and the greater the duration $\delta T$ that the decision module can consider. In this case, it sets $\delta T=D$ at S1103.

Conversely, if the stream does not have numerous spatial resynchronization points (coarse granularity—output "no" from test S1105), the decision module sets $\delta T=T$ (S1106) in order to give precedence to the retrieval of video fragments that are more precise.

Returning to FIG. 10, conversely if the type of client chosen possesses high computation capacities (test S1002 false), the server selects (at S1004), from a list of predefined network bandwidths, a bandwidth on which it envisages communicating. This may for example be a choice from among the different means of communication available to the server (wifi link, Ethernet link, mobile telephone link, ADSL link, etc.).

If it is a rather narrow bandwidth, less than the megabit per second (Mbit/s) for example, (the test S1005 is then true), the server 110 generates requests over shorter intervals of time with more precise regions of interest ROI (S1003 as described earlier), that is to say with a δT supposed to be low, close to the synchronization distance known by the server.

It is thus noted that step S1003 is carried out as soon as the server considers that the client terminal 120 or the network 130 is liable to experience saturation.

Conversely, if the server 110 selects a wide bandwidth, it may generate less precise elementary requests at S1006, typically with a δT that is a multiple of the synchronization distance.

This step is thus carried out principally when the server considers that the recipient 120 of the fragments and the network 130 are not liable to experience saturation. FIG. 12 illustrates an embodiment of this step S1006.

At the start of processing the server 110 possesses information relative to the current complex request REQACC, i.e. in addition to the video sequence 160 concerned, the times $t_i$ and $t_f$ delimiting the current temporal section as well as the associated regions $ROI(t_i)$ and $ROI(t_f)$.

The decision module starts by retrieving the synchronization distance T of the video sequence at S1200.

At S1201, it retrieves the initial and final times $t_i$ and $t_f$ corresponding to the current complex spatio-temporal request to determine the duration D of the temporal section corresponding to that current request.

The test S1202 determines whether this duration D is greater than twice the synchronization distance T.

In the negative, the decision module sets δT=D at S1203 (in similar manner to S1103).

In the affirmative, the current temporal section may be decomposed into smaller sub-intervals of time, notably for example of the order of T. In this case, the decision module 125 performs a loop to search for the best temporal decomposition at steps S1204 to S1212.

In detail, at S1204, it initializes two parameters $d_1$=D/2 and $d_2$=D.

Next, at S1205, it computes the intermediate regions of interest $maxROI(t_n,t_n+δT)$ for the current value of the factor δT=$d_1$. These intermediate regions are in particular obtained by linear interpolation along the temporal axis, between the initial and final regions $ROI(t_i)$ and $ROI(t_f)$.

At S1206, the decision module computes the transmission cost, denoted C1, of the video fragments for the current factor δT.

These costs correspond in particular to the quantity of video data to transmit moreover taking into account the accessibility of the video stream (which requires the transmission of the whole packets/slices). It may be estimated by approximation by computing the volumes $164_n$, or on the basis of statistics (cost in bits of the macro-blocks of the images and regions to transmit) available to the coder, or by extraction of the corresponding data and retrieval of their size.

At S1207, it computes the transmission cost, denoted C2, of the video fragments for the factor δT at the preceding iteration. The computation may consists in retrieving the cost C1 computed at the preceding iteration.

At S1208, the decision module 125 compares the costs C1 and C2 relative to a threshold value, for example C1/C2 with ½.

If the decomposition enables a significant saving in terms of rate (for example: C1<C2/2—output "yes" from test S1208), the decision module continues the decomposition into more precise requests, while first of all ensuring that the factor δT ($d_1$) remains greater than the synchronization distance T (test S1209) then by updating (S1210) the two parameters: $d_1$=$d_1$/2 and $d_2$=$d_1$. It then loops again to step S1205.

If the decomposition does not enable a saving (output "no" from test S1208), the decision module chooses δT=$d_2$ (E1211), which thus corresponds to the decomposition of the preceding iteration.

Lastly, if the factor δT risks being lower than T (output "no" from test S1209), the decomposition stops with the value $d_l$ (S1212) of the decomposition of the current iteration as factor δT.

Thus, the decomposition continues so long as the saving in terms of transmission cost remains worthwhile (test S1108 true) and so long as the time interval obtained remains greater than or equal to T (test S1110 true). A good compromise between the precision of the elementary requests $REQ_n$, their frequency and the size of the data to transmit is thus obtained.

Returning to FIG. 10, once the duration δT has been obtained either at step S1003 or at step S1006, the processing continues at S1007 with the downsampling of the current temporal section into sub-intervals of duration equal to δT. It is to be noted that this step may already have been carried out at step S1205.

Next the intermediate regions of interest $ROI(t_n)$ for each of the intermediate times ($t_n$) separating two sub-intervals are computed (S1008) by linear interpolation on the temporal axis between the initial and final regions $ROI(t_i)$ and $ROI(t_f)$ (also carried out at step S1205).

An elementary request $REQ_n$ for access to the part 162 of video sequence 160 is then generated (S1009) by indicating a said sub-interval and the rectangle $maxROI(t_n,t_{n+1}=t_n+δT)$ encompassing the two computed intermediate regions ROI ($t_n$) and $ROI(t_{n+1})$ corresponding to that interval.

Steps S1010 and S1011 enable iteration over all the sub-intervals until the end $t_f$ of the current temporal section is attained.

Figure 13:
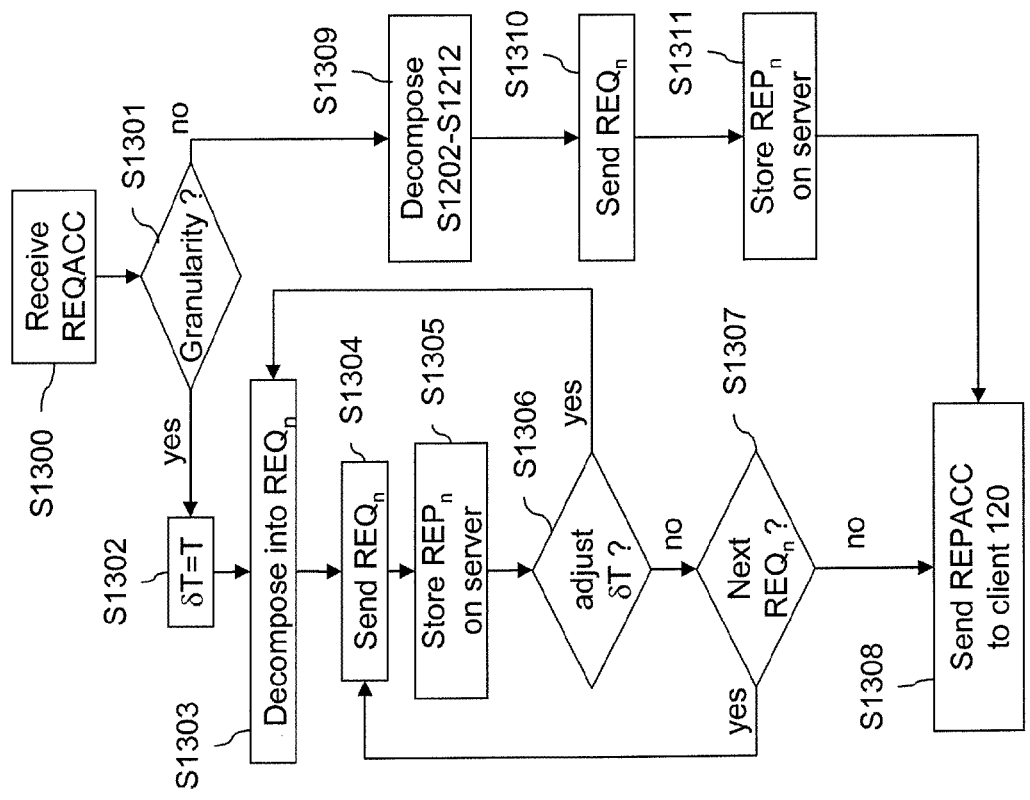
FIG. 13 illustrates, in flow diagram form, steps of an implementation of the invention when the decomposition of the requests is carried out at an intermediate node between the client terminal and the server device of FIG. 2.

With reference to FIG. 13, a description is now given of an embodiment of the invention in which said decision module 125 is implemented in an intermediate node of the network 130, in particular in a proxy or "proximity" server 140.

In this embodiment, the client terminal 120 sends the proxy 140 complex spatio-temporal requests REQACC. A particular syntax (not compatible with the Media Fragments URI recommendation in its current state) is adopted for transmitting all the necessary parameters.

FIG. 14 illustrates examples of possible syntax. In these examples, the client terminal 120 signals the temporal section [$t_i$, $t_f$] of the desired part 162 in conventional manner, and gives information on the spatial part by adding a component "t" to the conventional parameter "xywh": "xywht" in which the component "t" enables a spatial variation to be indicated (including spatial movement and/or spatial deformation) of the region of interest $ROI(t_i)$=xywh over time.

In the first example given relative to a simple translation (the region of interest maintains its dimensions), the component "t" corresponds to a translation vector (Tx, Ty) of the region of interest between $t_i$ and $t_f$.

In the second example given relative to a translation and a zoom with use of the SVG syntax, the parameter "t" combines a translation vector and transformation factors, here homothetic factors (sx, sy) along the horizontal and vertical axes.

Optionally, the client terminal 120 may also transmit, in its request, a "granularity" parameter indicating whether or not it wishes to obtain fine granularity (precise and more frequent requests). This is the case of the third example provided in which the parameter "t" is an affine transformation matrix A.

Of course parameters describing more complex transformations may be provided.

Step S1300 corresponds to the reception of these requests by the proxy 140. The latter then determines the presence or not of a granularity indication at S1301. For this it goes through the complex spatio-temporal request and stores the parameters present in the request (time interval requested, first spatial region requested, transformation parameters to apply and, the case arising, the parameter indicating whether the client wishes to have fine granularity or not).

If the request indicates a request for fine granularity (output "yes" from test S1301), at S1302 the proxy 140 initializes the factor $\delta T$ to a value T which may either be one second, or the synchronization period if it is known to the proxy 140, or the last value used by the proxy for the video requested.

This factor $\delta T$ is applied to the complex request REQACC received at S1300 to generate a list of elementary requests $REQ_n$ over time intervals of duration $\delta T$ (S1303).

The elementary requests $REQ_n$ are then successively submitted to the server 110 (for example in their temporal order). Step S1304 first of all consists in transmitting the first requests $REQ_i$ corresponding to the interval $[t_i, t_i+\delta T]$, then, at the following iterations, the requests $REQ_n$.

At S1305, the response $REP_n$ from the server 110 is received and kept in memory of the proxy. This response comprises in particular the extracted video fragment $164_n$.

Further to this response, the proxy may decide to adjust its factor $\delta T$ at step S1306. Conditions justifying the adjustment of the factor $\delta T$ correspond for example to the following cases:
- an error of the server. This case leads to the doubling of the factor $\delta T$;
- a temporal extraction greater than the time interval requested. This case leads to adjusting the value of factor $\delta T$ to the duration of the extracted temporal segment;
- a spatial extraction different from the requested region. If the extracted region is larger than the requested region, this case leads to dividing the factor $\delta T$ by 2; otherwise in doubling the factor $\delta T$ since it indicates that the requested video is providing good spatial granularity.

Other performance criteria cited previously may also be used.

If an adjustment is necessary, the processing loops on step S1303 to update the decomposition into elementary requests, in particular for the requests not yet submitted.

If no adjustment is necessary, the decision module performs a loop on the following elementary request at S1307 until the last one.

When the last request has been reached (test S1307 false), the proxy 140 sends a response REPACC to the client 120 in the form of an HTTP response with multiple byte ranges, each byte range corresponding to a response $REP_n$ from the server 110 stored at S1305.

If the client has not expressed any wish as to the granularity of the response or indicated a coarse granularity (output "no" from test S1301), at S1309 the proxy 140 then applies a decomposition similar to that described above with reference to steps S1202 to S1212.

The elementary requests $REQ_n$ so obtained are successively sent to the server 110 (S1310) and each response $REP_n$ is stored (S1311) to form the response REPACC at S1308.

Figure 15:
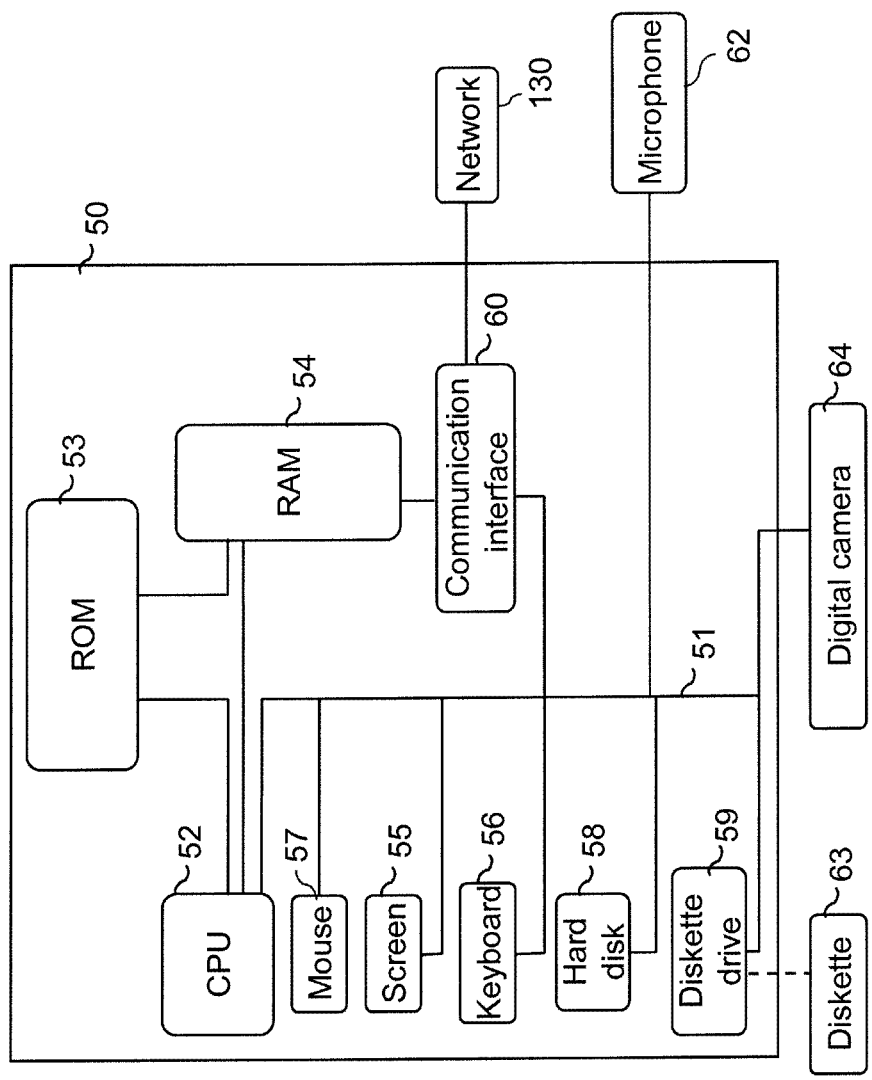
FIG. 15 shows a particular hardware configuration of a device adapted for an implementation of the method or methods according to the invention.

With reference now to FIG. 15, a description is given by way of example of a particular hardware configuration of a device for video sequence access adapted for an implementation of the methods according to the invention.

A device implementing the present invention is for example a micro-computer 50, a workstation, a personal assistant, or a mobile telephone connected to different peripherals. According to still another embodiment of the invention, the device takes the form of a camera provided with a communication interface to enable connection to a network.

The peripherals connected to the device comprise for example a digital camera 64, or a scanner or any other means of image acquisition or storage, connected to an input/output card (not shown) and supplying multimedia data, for example of video sequence type, to the device according to the invention.

The device 50 comprises a communication bus 51 to which there are connected:
- a central processing unit CPU 52 taking for example the form of a microprocessor;
- a read only memory 53 in which may be contained the programs whose execution enables the implementation of the methods according to the invention. It may be a flash memory or EEPROM;
- A random access memory 54, which, after powering up of the device 50, contains the executable code of the programs of the invention necessary for the implementation of the invention. As this memory 54 is of random access type (RAM), it provides fast accesses compared to the read only memory 53. This RAM memory 54 stores in particular the various images and the various blocks of pixels as the processing is carried out on the video sequences;
- a screen 55 for displaying data, in particular video and/or serving as a graphical interface with the user, who may thus interact with the programs according to the invention, using a keyboard 56 or any other means such as a pointing device, for example a mouse 57 or an optical stylus;
- a hard disk 58 or a storage memory, such as a memory of compact flash type, able to contain the programs of the invention as well as data used or produced on implementation of the invention;
- an optional diskette drive 59, or another reader for a removable data carrier, adapted to receive a diskette 63 and to read/write thereon data processed or to process in accordance with the invention; and
- a communication interface 60 connected to the telecommunications network 130, the interface 60 being adapted to transmit and receive data.

In the case of audio data, the device 50 is preferably equipped with an input/output card (not shown) which is connected to a microphone 62.

The communication bus 51 permits communication and interoperability between the different elements included in the device 50 or connected to it. The representation of the bus 51 is non-limiting and, in particular, the central processing unit 52 unit may communicate instructions to any element of the device 50 directly or by means of another element of the device 50.

The diskettes 63 can be replaced by any information carrier such as a compact disc (CD-ROM) rewritable or not, a ZIP disk or a memory card. Generally, an information storage means, which can be read by a micro-computer or microprocessor, integrated or not into the video sequence processing device, and which may possibly be removable, is adapted to store one or more programs whose execution permits the implementation of the methods according to the invention.

The executable code enabling the device for accessing a spatio-temporal part of a video sequence to implement the invention may equally well be stored in read only memory 53, on the hard disk 58 or on a removable digital medium such as a diskette 63 as described earlier. According to a variant, the executable code of the programs is received by the intermediary of the telecommunications network 130, via the interface 60, to be stored in one of the storage means of the device 50 (such as the hard disk 58) before being executed.

The central processing unit 52 controls and directs the execution of the instructions or portions of software code of the program or programs of the invention, the instructions or portions of software code being stored in one of the aforementioned storage means. On powering up of the device 50, the program or programs which are stored in a non-volatile memory, for example the hard disk 58 or the read only memory 53, are transferred into the random-access memory 54, which then contains the executable code of the program or programs of the invention, as well as registers for storing the variables and parameters necessary for implementation of the invention.

It will also be noted that the device implementing the invention or incorporating it may be implemented in the form of a programmed apparatus. For example, such a device may then contain the code of the computer program(s) in a fixed form in an application specific integrated circuit (ASIC).

The device described here and, particularly, the central processing unit 52, may implement all or part of the processing operations described in relation with FIGS. 1 to 14, to implement the methods of the present invention and constitute the devices of the present invention.

The preceding examples are only embodiments of the invention which is not limited thereto.

In particular, the alignment of the initial $t_i$, final $t_f$, and intermediate or key $t_n/t_c$ times with images having no temporal dependency may be advantageously implemented in any one of the implementations of the invention.

The invention claimed is:

1. A processing method for accessing a spatio-temporal part of a compressed video sequence, comprising a step of obtaining a request for access to the spatio-temporal part by identifying a temporal section defined between an initial time ($t_i$) and a final time ($t_f$) in said sequence, characterized in that:
the access request identifies an initial spatial region of the sequence at the initial time, and a final spatial region of the sequence at the final time that is different from the initial spatial region;
and the method comprises the steps of:
decomposing the access request into a plurality of elementary requests successively and in a temporal order for access to a video fragment of the sequence, each elementary request identifying a fixed spatial region to extract in a temporal sub-interval of said temporal section; and
exploiting at least one elementary request to access at least one video fragment constituting the spatio-temporal part to access;
wherein the method further comprises a step of dynamically adjusting the decomposition of the access request during the processing of elementary requests,
wherein the adjusting step comprises the re-computation of the elementary requests not yet exploited into a plurality of elementary requests associated with temporal sub-intervals of modified duration, and
wherein a location and a size of the fixed spatial region are fixed between the initial time and the final time of the elementary requests.

2. A method according to claim 1, comprising the steps of:
transmitting the elementary request to a server device storing said video sequence and receiving, in return, at least one corresponding extracted fragment; and
re-computing the elementary requests not yet exploited on the basis of the received fragment.

3. A method according to claim 1, in which the decomposition or possible re-computation of the elementary requests not yet exploited and the associated modification of the duration depend on a performance criterion of a client terminal establishing the access request and/or of a server device storing said video sequence and/or of a communication network linking the client terminal and the server device.

4. A method according to claim 1, in which the duration of the temporal sub-intervals corresponding to the elementary requests depends on the spatial accessibility of image data composing the video sequence.

5. A method according to claim 1, in which the video sequence being compressed using a temporal prediction mechanism, the duration of the temporal sub-intervals corresponding to the elementary requests depends on the period separating two images without temporal dependency in the video sequence.

6. A method according to claim 5, wherein a temporal sub-interval is aligned with images of the video sequence which are not compressed by temporal prediction.

7. A method according to claim 5, in which the initial time is offset to align with the last image of the video sequence that precedes the initial time and that is not compressed by temporal prediction.

8. A method according to claim 1, wherein the decomposition into elementary requests is implemented at a client terminal establishing said access request.

9. A method according to claim 1, wherein the decomposition into elementary requests is implemented at a server device storing said compressed video sequence.

10. A method according to claim 9, wherein the server device makes available to a client terminal the list of the elementary requests.

11. A method according to claim 1, wherein the decomposition into elementary requests is implemented at an intermediate device located on a communication network between a client terminal making said access request and a server device storing said compressed video sequence.

12. A method according to claim 11, wherein said intermediate device is a proxy which receives the access request from the client terminal, sends each of the elementary requests to the server device, stores each of the video fragments received from the server device and transmits a response to the access request from the client terminal that is established on the basis of the stored video fragments.

13. A method according to claim 1, in which the decomposition of the access request comprises iteratively determining the duration of the temporal sub-intervals.

14. A method according to claim 13, wherein said iterative determining comprises iteratively sub-dividing the temporal sub-intervals for as long as the ratio between the estimated costs of transmitting the video fragments respectively corresponding to a sub-interval after iteration and to a sub-interval before iteration is less than a threshold value.

15. A method according to claim 1, in which the elementary request comprises at least one parameter defining the fixed spatial region, and a component representing a spatial variation of the fixed spatial region during the corresponding temporal sub-interval.

16. A processing method for accessing a spatio-temporal part of a compressed video sequence, comprising a step of obtaining a request for access to the spatio-temporal part by identifying a temporal section defined between an initial time ($t_i$) and a final time ($t_f$) in said sequence, characterized in that:

the access request identifies an initial spatial region of the sequence at the initial time, and a final spatial region of the sequence at the final time that is different from the initial spatial region;

and the method comprises the steps of:

decomposing the access request into a plurality of elementary requests successively and in a temporal order for access to a video fragment of the sequence, each elementary request identifying a fixed spatial region to extract in a temporal sub-interval of said temporal section; and exploiting at least one elementary request to access at least one video fragment constituting the spatio-temporal part to access;

wherein the decomposition comprises a step of performing linear interpolation, along a temporal axis, of two intermediate spatial regions corresponding to the two extreme times of the temporal sub-interval, on the basis of the initial and final spatial regions, and wherein a location and a size of the fixed spatial region are fixed between the initial time and the final time of the elementary requests.

17. A method according to claim 16, wherein said fixed spatial region associated with said temporal sub-interval encompasses said corresponding two intermediate spatial regions.

18. A means of non-transitory information storage, possibly totally or partially removable, that is readable by a computer system, comprising instructions for a computer program adapted to implement the method according to claim 16, when the program is loaded and executed by the computer system.

19. A processing device for accessing a spatio-temporal part of a compressed video sequence on the basis of an access request, the access request identifying a temporal section defined between an initial time and a final time in the sequence, characterized in that:

the access request furthermore identifies an initial spatial region of the sequence at the initial time, and a final spatial region of the sequence at the final time that is different from said initial spatial region;

and the device comprises:

a processor; and a memory containing instructions that, when executed by the processor, perform operations comprising:

decomposing the access request into a plurality of elementary requests successively and in a temporal order for access to a video fragment of the sequence, each elementary request identifying a fixed spatial region to extract in a temporal sub-interval of the temporal section; and exploiting at least one elementary request to access at least one video fragment constituting said spatio-temporal part to access, wherein a location and a size of the fixed spatial region are fixed between the initial time and the final time of the elementary requests, and wherein the operations further comprises dynamically adjusting the decomposition of the access request during the processing of elementary requests and the adjusting comprises the re-computation of the elementary requests not yet exploited into a plurality of elementary requests associated with temporal sub-intervals of modified duration.

20. A means of non-transitory information storage, possibly totally or partially removable, that is readable by a computer system, comprising instructions for a computer program adapted to implement the method according claim 1, when the program is loaded and executed by the computer system.

21. A processing device for accessing a spatio-temporal part of a compressed video sequence on the basis of an access request, the access request identifying a temporal section defined between an initial time and a final time in the sequence, characterized in that:

the access request furthermore identifies an initial spatial region of the sequence at the initial time, and a final spatial region of the sequence at the final time that is different from said initial spatial region;

and the device comprises:

a processor; and a memory containing instructions that, when executed by the processor, perform operations comprising:

decomposing the access request into a plurality of elementary requests successively and in a temporal order for access to a video fragment of the sequence, each elementary request identifying a fixed spatial region to extract in a temporal sub-interval of the temporal section; and exploiting at least one elementary request to access at least one video fragment constituting said spatio-temporal part to access, wherein the decomposition comprises a step of performing linear interpolation, along a temporal axis, of two intermediate spatial regions corresponding to the two extreme times of the temporal sub-interval, on the basis of the initial and final spatial regions, and wherein a location and a size of the fixed spatial region are fixed between the initial time and the final time of the elementary requests.

* * * * *